(12) United States Patent
Nakao

(10) Patent No.: US 10,261,630 B2
(45) Date of Patent: Apr. 16, 2019

(54) INPUT DEVICE, INPUT SUPPORT METHOD, AND PROGRAM

(71) Applicant: PANASONIC CORPORATION, Osaka (JP)

(72) Inventor: Masatoshi Nakao, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 144 days.

(21) Appl. No.: 14/234,470

(22) PCT Filed: Mar. 13, 2013

(86) PCT No.: PCT/JP2013/001679
§ 371 (c)(1),
(2) Date: Jan. 23, 2014

(87) PCT Pub. No.: WO2013/161162
PCT Pub. Date: Oct. 31, 2013

(65) Prior Publication Data
US 2014/0176477 A1 Jun. 26, 2014

(30) Foreign Application Priority Data

Apr. 27, 2012 (JP) .................. 2012-104125
Jun. 22, 2012 (JP) .................. 2012-141277

(51) Int. Cl.
*G06F 3/041* (2006.01)
*G06F 3/042* (2006.01)
(Continued)

(52) U.S. Cl.
CPC .......... *G06F 3/0418* (2013.01); *G06F 3/0416* (2013.01); *G06F 3/04842* (2013.01); *G06F 3/04883* (2013.01); *G06F 2203/04101* (2013.01)

(58) Field of Classification Search
CPC . G06F 2203/04108; G06F 2203/04101; G06F 3/041–3/047
(Continued)

(56) References Cited

U.S. PATENT DOCUMENTS 5,598,187 A    1/1997  Ide et al.
2001/0024195 A1  9/2001  Hayakawa
(Continued)

FOREIGN PATENT DOCUMENTS

JP    4-127314    4/1992
JP    07-028591   1/1995
(Continued)

OTHER PUBLICATIONS

U.S. Appl. No. 14/236,097 to Masatoshi Nakao, filed Jan. 30, 2014.
(Continued)

*Primary Examiner* — Joseph R Haley
(74) *Attorney, Agent, or Firm* — Greenblum & Bernstein, P.L.C.

(57) ABSTRACT

An input device includes a display unit which displays data on a screen, a proximity detection unit which detects proximity of a finger to the screen and outputs a proximity detection signal, a manipulation judging unit which discriminates between a valid manipulation and a return manipulation of successive movement manipulations of the finger on the basis of proximity detection signals in accordance with the successive movement manipulations of the proximity detected finger, and a control unit which invalidates proximity detection signals corresponding to the discriminated return manipulation.

9 Claims, 22 Drawing Sheets

(51) Int. Cl.
*G06F 3/043* (2006.01)
*G06F 3/044* (2006.01)
*G06F 3/045* (2006.01)
*G06F 3/046* (2006.01)
*G06F 3/047* (2006.01)
*G06F 3/048* (2013.01)
*G06F 3/0484* (2013.01)
*G06F 3/0488* (2013.01)

(58) Field of Classification Search
USPC .............................. 178/18.01–18.09, 18.11
See application file for complete search history.

(56) References Cited

U.S. PATENT DOCUMENTS

| | | | |
|---|---|---|---|
| 2004/0021643 A1* | 2/2004 | Hoshino et al. | 345/173 |
| 2004/0125081 A1 | 7/2004 | Hayakawa | |
| 2004/0243747 A1 | 12/2004 | Rekimoto | |
| 2006/0055662 A1 | 3/2006 | Rimas-Ribikauskas et al. | |
| 2006/0092142 A1* | 5/2006 | Gillespie et al. | 345/173 |
| 2008/0122798 A1 | 5/2008 | Koshiyama et al. | |
| 2009/0058830 A1* | 3/2009 | Herz et al. | 345/173 |
| 2009/0160803 A1 | 6/2009 | Hashimoto | |
| 2009/0284465 A1 | 11/2009 | Oki et al. | |
| 2010/0099464 A1* | 4/2010 | Kim | 455/566 |
| 2011/0050629 A1 | 3/2011 | Homma et al. | |
| 2011/0157078 A1 | 6/2011 | Miyazawa et al. | |
| 2011/0175831 A1 | 7/2011 | Miyazawa et al. | |
| 2012/0019485 A1 | 1/2012 | Sato et al. | |
| 2012/0102437 A1* | 4/2012 | Worley | G06F 3/04883 345/173 |
| 2013/0050269 A1* | 2/2013 | Arrasvuori | G06T 3/0025 345/661 |
| 2014/0176510 A1* | 6/2014 | Nakao | 345/178 |
| 2014/0253518 A1* | 9/2014 | Takano | G06F 3/0418 345/178 |

FOREIGN PATENT DOCUMENTS

| | | | | |
|---|---|---|---|---|
| JP | 2001-265481 | 9/2001 | | |
| JP | 2002-342033 | 11/2002 | | |
| JP | 2004-348604 | 12/2004 | | |
| JP | 2006-085703 | 3/2006 | | |
| JP | 2008-117371 | 5/2006 | | |
| JP | 2007-509448 | 4/2007 | | |
| JP | 2007-516496 | 6/2007 | | |
| JP | 2009-151691 | 7/2009 | | |
| JP | 2009-217477 | 9/2009 | | |
| JP | 2009-255903 | 11/2009 | | |
| JP | 2009-276279 | 11/2009 | | |
| JP | 2009-217477 A | * 12/2009 | ............ | G06F 3/048 |
| JP | 2010-186442 | 8/2010 | | |
| JP | 2010-277198 | 12/2010 | | |
| JP | 2011-053971 | 3/2011 | | |
| JP | 2011-134069 | 7/2011 | | |
| JP | 2011-134271 | 7/2011 | | |
| JP | 2011-150414 | 8/2011 | | |
| JP | 2012-027796 | 2/2012 | | |
| JP | 2012-43180 | 3/2012 | | |
| JP | 2012-069045 | 4/2012 | | |
| JP | 2012-234317 | 11/2012 | | |
| WO | 2004/102285 | 11/2004 | | |
| WO | 2005/040991 | 5/2008 | | |
| WO | 2008/093682 | 8/2008 | | |

OTHER PUBLICATIONS

U.S. Appl. No. 14/156,803 to Noriyuki Kawahara et al., filed Jan. 16, 2014.
International Search Report PCT/JP2013/001679, dated Jun. 18, 2013.
Notice of Allowance for JP 2012-141277, dated Aug. 5, 2014.
Notice of Allowance for JP 2013-160554, dated Dec. 17, 2013.
Final Rejection of JP 2012-141277, dated Mar. 4, 2014, along with English translation.
Notification of Reasons for Refusal of JP 2013-160554, dated Sep. 3, 2013, along with English translation.

* cited by examiner

| | FINGER HEIGHT | FINGER MOVEMENT SPEED | WHETHER TO USE HOVER SIGNAL |
|---|---|---|---|
| VALID MANIPULATION | LOW (h1) | FAST (v1) | USE HOVER SIGNAL FOR CONTROL (INFORM APPLICATION) |
| RETURN MANIPULATION | HIGH (h2) | SLOW (v2) | DISCARD HOVER SIGNAL |

(A)  (B)

INPUT DEVICE, INPUT SUPPORT METHOD, AND PROGRAM

TECHNICAL FIELD

The present invention relates to an input device, an input support method, and a program for receiving input manipulations through a touch panel.

BACKGROUND ART

In recent years, electronic apparatus incorporating a touch panel have come into wide use. And touch panels which enable users to make intuitive manipulations have come to be used widely as devices for receiving input manipulations on electronic apparatus including cellphones. Touch panels enable, through the same screen of a display unit (e.g., LCD (liquid crystal display) or organic EL (electroluminescence) display) provided in an electronic apparatus, reception of an input manipulation on the screen and display processing for a processing result of the electronic apparatus.

Touch panels are also known which can detect coming into proximity of a finger (refer to Patent document 1, for example). Touch panels of this kind can detect a state that a finger is placed over the touch panel at a height position that is spaced from the touch panel by a certain distance, that is, a state of proximity of a finger to the touch panel, and can detect a manipulation that a finger is slid approximately parallel with the touch panel on the basis of a capacitance that is determined by a distance between the finger and the touch panel like a manipulation that a finger is slid being kept in direct contact with the touch panel. As such, touch panels capable of detecting coming into proximity of a finger are expected to become a new user interface.

The non-contact user input device disclosed in Patent document 1 include plural linear transmission electrodes, a transmitter for supplying transmission AC currents to the respective transmission electrodes, plural linear reception electrodes disposed so as not to be in contact with the transmission electrodes, and a receiver for receiving AC currents that flow through the respective reception electrodes. Capacitors are formed at the crossing points of the transmission electrodes and the reception electrodes and capacitors are formed as a fingertip of the user comes closer. Therefore, the capacitances of the capacitors vary according to the degree of proximity of the finger. The non-contact user input device can recognize the distance between the touch panel and the finger on the basis of variations of the capacitances.

PRIOR ART DOCUMENTS

Patent Documents

Patent document 1: JP-A-2002-342033

SUMMARY OF THE INVENTION

Problems to be Solved by the Invention

However, in the conventional input device, when the user places a finger at a spatial position that is spaced from the touch panel or moves a finger approximately parallel with the touch panel or touches the touch panel with a finger after placing the finger at such a position, there may occur an event that a manipulation that is not one intended by the user is detected. That is, in the conventional input device, since a manipulation that is not intended by the user may be detected, a manipulation content that is not intended by the user, that is, an erroneous manipulation content, may be accepted. Thus, the user may be rendered unable to enjoy comfortable manipulations.

The present invention has been made in the above-described circumstances, and an object of the present invention is to provide an input device, an input support method, and a program which allow the user to enjoy comfortable manipulations by effectively preventing detection of a manipulation that is not intended by the user and thereby lowering the probability of acceptance of an erroneous manipulation content.

Means for Solving the Problems

The invention provides an input device comprising a display unit which displays data on a screen; a proximity detection unit which detects proximity of a finger to the screen and outputs a proximity detection signal; a manipulation judging unit which discriminates between a valid manipulation and a return manipulation of successive movement manipulations of the finger on the basis of proximity detection signals in accordance with the successive movement manipulations of the proximity detected finger; and a control unit which invalidates the proximity detection signal corresponding to the discriminated return manipulation.

The invention also provides an input support method of an input device which displays data on a screen, comprising the steps of detecting proximity of a finger to the screen and outputting a proximity detection signal; receiving successive movement manipulations of the proximity-detected finger; discriminating between a valid manipulation and a return manipulation of the successive movement manipulations of the finger on the basis of proximity detection signals; and invalidating the proximity detection signal corresponding to the discriminated return manipulation.

The invention also provides a program for causing a computer which is an input device including a display unit for displaying data on a screen, to realize the steps of detecting proximity of a finger to the screen and outputting a proximity detection signal; receiving successive movement manipulations of the proximity-detected finger; discriminating between a valid manipulation and a return manipulation of the successive movement manipulations of the finger on the basis of proximity detection signals; and invalidating the proximity detection signal corresponding to the discriminated return manipulation.

According to this configuration, the probability of acceptance of an erroneous manipulation of a user can be lowered by correctly discriminating between a valid manipulation and a return manipulation of successive movement manipulations that are input by the user through a touch panel and thereby invalidating return signals.

Furthermore, the invention provides an input device which comprises a display unit which displays data on a screen; a proximity detection unit which detects proximity of a finger to the screen and outputs a proximity detection signal; a contact detection unit which detects contact of a finger to the screen and outputs a contact detection signal; a manipulation validity judging unit which judges whether a touch manipulation of the finger is a flick manipulation on the basis of proximity detection signals produced before and after contact of the finger to the screen; and a display control unit which, if the touch manipulation is judged as a flick manipulation, displays an operation result corresponding to the flick manipulation on the screen.

According to this configuration, the probability of occurrence of erroneous detection of an input manipulation can be lowered by correctly discriminating between a touch manipulation and a flick manipulation which are intentional manipulations of a user.

Still further, the invention provides an input device which comprises a display unit which displays data on a screen; a proximity detection unit which detects proximity of a finger to the screen and outputs proximity detection signals; a contact detection unit which detects contact of the finger to the screen and outputs a contact detection signal; a manipulation validity judging unit which judges whether a touch manipulation of the finger is valid on the basis of the proximity detection signals and the contact detection signal; and a control unit which invalidates the contact detection signal if the touch manipulation of the finger is judged as invalid.

According to this configuration, the probability of occurrence of erroneous detection by a touch panel can be lowered by correctly discriminating between an intentional touch manipulation and an unconscious contact action of a user.

The invention also provides an input support method of an input device including a display unit for displaying data on a screen, comprising the steps of detecting proximity of a finger to the screen and outputting a proximity detection signal; detecting contact of the finger to the screen and outputting a contact detection signal; judging whether a touch manipulation of the finger is a flick manipulation on the basis of proximity detection signals produced before and after contact of the finger to the screen; and if the touch manipulation is judged as a flick manipulation, displaying an operation result corresponding to the flick manipulation on the screen.

According to this method, the probability of occurrence of erroneous detection of an input manipulation can be lowered by correctly discriminating between a touch manipulation and a flick manipulation which are intentional manipulations of a user.

The invention also provides an input support method of an input device including a display unit for displaying data on a screen, comprising the steps of detecting proximity of a finger to the screen and outputting a proximity detection signal; detecting contact of the finger to the screen and outputting a contact detection signal; judging whether a touch manipulation of the finger is valid on the basis of proximity detection signals and the contact detection signal; and invalidating the contact detection signal if the touch manipulation of the finger is judged as invalid.

According to this method, the probability of occurrence of erroneous detection by a touch panel can be lowered by correctly discriminating between an intentional touch manipulation and an unconscious contact action of a user.

The invention also provides a program for causing a computer which is an input device including a display unit for displaying data on a screen, to execute the steps of detecting proximity of a finger to the screen and outputting a proximity detection signal; detecting contact of the finger to the screen and outputting a contact detection signal; judging whether a touch manipulation of the finger is a flick manipulation on the basis of proximity detection signals produced before and after contact of the finger to the screen; and if the touch manipulation is judged as a flick manipulation, displaying an operation result corresponding to the flick manipulation on the screen.

According to this program, the probability of occurrence of erroneous detection of an input manipulation can be lowered by correctly discriminating between a touch manipulation and a flick manipulation which are intentional manipulations of a user.

The invention also provides a program for causing a computer which is an input device including a display unit for displaying data on a screen, to execute the steps of detecting proximity of a finger to the screen and outputting a proximity detection signal; detecting contact of the finger to the screen and outputting a contact detection signal; judging whether a touch manipulation of the finger is valid on the basis of proximity detection signals and the contact detection signal; and invalidating the contact detection signal if the touch manipulation of the finger is judged as invalid.

According to this program, the probability of occurrence of erroneous detection by a touch panel can be lowered by correctly discriminating between an intentional touch manipulation and an unconscious contact action of a user.

Advantageous Effects of the Invention

The invention makes it possible to lower the probability of acceptance of an erroneous manipulation of a user by correctly discriminating between the valid signal and the return signal of successive movement manipulations that are input by the user through a touch panel and invalidating the return signal.

BRIEF DESCRIPTION OF THE DRAWINGS

FIG. 5(A) is a graph showing a coordinate variation with time, FIG. 5(B) is a graph showing a finger height variation with time, and FIG. 5(C) is a graph showing a hover signal intensity variation (actual measurement values) with time.

FIG. 6(A) is a graph showing coordinates variations with time, and FIG. 6(B) is a graph showing a finger movement speed variation with time.

MODE FOR CARRYING OUT THE INVENTION

Figure 1:
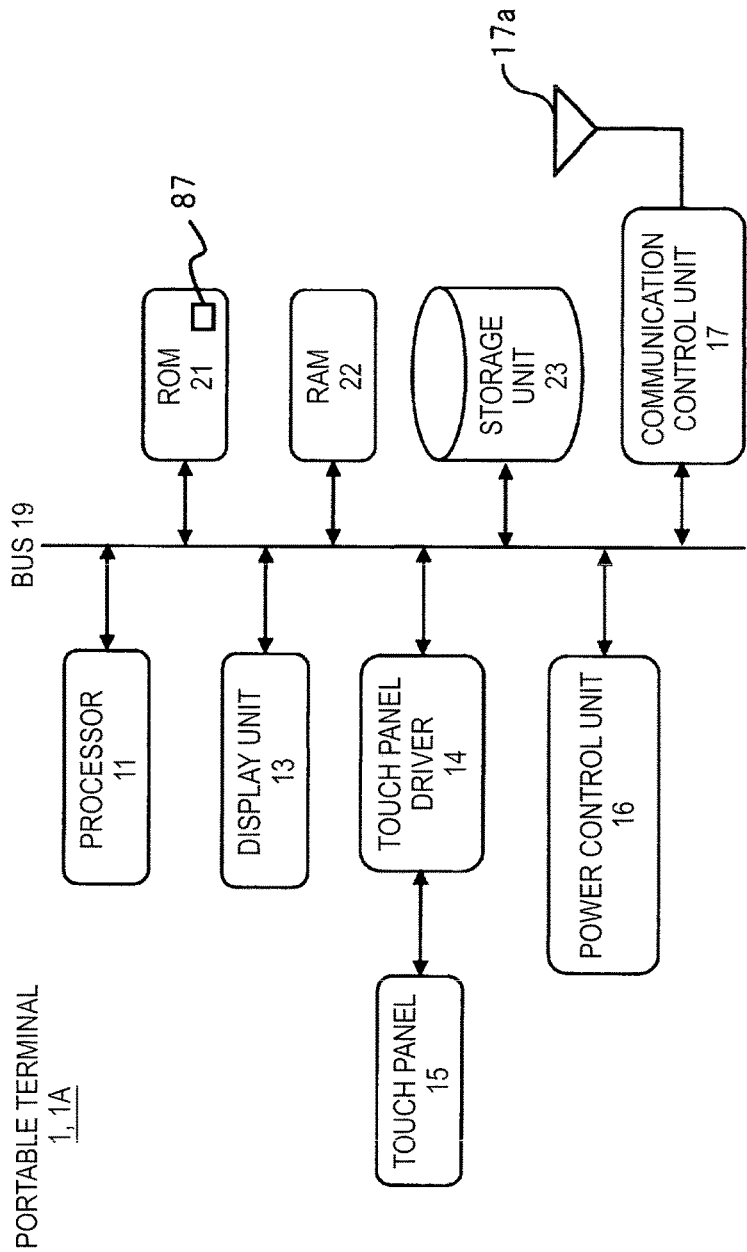
FIG. 1 is a block diagram showing the hardware configuration of portable terminals according to embodiments.

Input device, input support methods, and programs according to embodiments of the present invention will be hereinafter described with reference to the drawings. Input device to which the embodiments are applicable encompass electronic apparatus incorporating a display unit for displaying data on the screen, such as a cellphone, a smartphone, a tablet terminal, a digital still camera, a PDA (personal digital assistant), and an e-book terminal. The following embodiments will be directed to portable terminals (e.g., smartphones) as example input device.

The invention can also be expressed as an input device as an apparatus or a program for causing an input device to operate as a computer. Furthermore, the invention can also be expressed as an input support method including individual operations (steps) performed by an input device. That is, the invention can be expressed in any of the categories of an apparatus, a method, and a program.

In the following description, the term "button" is defined as an item that enables reception of a user touch manipulation and selection of a portion of a content of each application displayed on the screen (of an LCD or an organic EL display) of an input device or an item that enables activation of a prescribed process for a content when selected. The prescribed process means a process of performing an operation relating to a content being displayed by an application (e.g., a process of reproducing video data).

When news headlines, for example, are being displayed as an application content, "buttons" may be hyperlinked character strings, that is, news headlines, images (e.g., icons or software keyboard keys) for urging a user to make a selection manipulation, or a combination of character strings and images. For example, an input device can receive selection of a news headline corresponding to a button in the form of a manipulation made on the button and display the details of a piece of news corresponding to the selected button. "Buttons" are determined according to an application running on an input device.

The two axes that represent the horizontal surface of a touch panel are called x and y axes, and the axis that is vertical to the touch panel (i.e., the axis in the height direction) is called a z axis. Furthermore, in the following description, it is assumed that the term "coordinates" includes coordinates (x, y) which are a combination of x and y coordinates and represent a position on the horizontal surface of the touch panel and coordinates (x, y, z) which are a combination of the above coordinates (x, y) and a coordinate z which represents a distance between the touch panel and a finger in the vertical direction, that is, a height of the finger from the touch panel.

Although the following description will be made using a user finger (e.g., index finger; this will also apply in the following description) as an indication medium for the touch panel, the indication medium is not limited to a finger and may be a conductive stylus held by a user hand. No particular limitations are imposed on the indication medium as long as coming into proximity or a touch to the touch panel can be detected according to the touch panel structure or detection method.

Still further, in the following description, a "hover manipulation" is defined as a manipulation of placing a finger at a spatial position that is spaced from the surface of the touch panel and a "hover slide manipulation" is defined as a manipulation of sliding (moving) a finger from a spatial position of a hover manipulation approximately parallel with the touch panel surface. Therefore, a manipulation that a finger directly touches the surface of a touch panel is a touch manipulation rather than a hover manipulation. And a "touch slide manipulation" is defined as a touch manipulation that a finger is slid (moved) being kept in contact with the surface of the touch panel.

For a hover manipulation or a hover slide manipulation to be detected, it is preferable that the distance between the finger and the touch panel be in a distance range corresponding to a detectable capacitance range of the touch panel. This is because the distance is inversely proportional to the capacitance detected by the touch panel.

(Hardware Configuration of Portable Terminal Common to Embodiments)

FIG. 1 is a block diagram showing the hardware configuration of portable terminals 1 and 1A according to embodiments. The portable terminals 1 and 1A shown in FIG. 1 includes a processor 11, a display unit 13, a touch panel driver 14, a touch panel 15, a power control unit 16, a communication control unit 17 to which an antenna 17a is connected, a ROM (read-only memory) 21, a RAM (random access memory) 22, and a storage unit 23.

The processor 11, the display unit 13, the touch panel driver 14, the power control unit 16, the communication control unit 17, the ROM 21, the RAM 22, and the storage unit 23 are connected to each other via a bus 19 so as to be able to exchange data mutually.

The processor 11, which is formed using, for example, a CPU (central processing unit), an MPU (micro processing unit), or a DSP (digital signal processor), performs an overall control of the portable terminal 1 or 1A and various other kinds of computation processing and control processing. The processor 11 reads programs and data stored in the ROM 21 and performs various kinds of processing of each of the embodiments described below.

Figure 2:
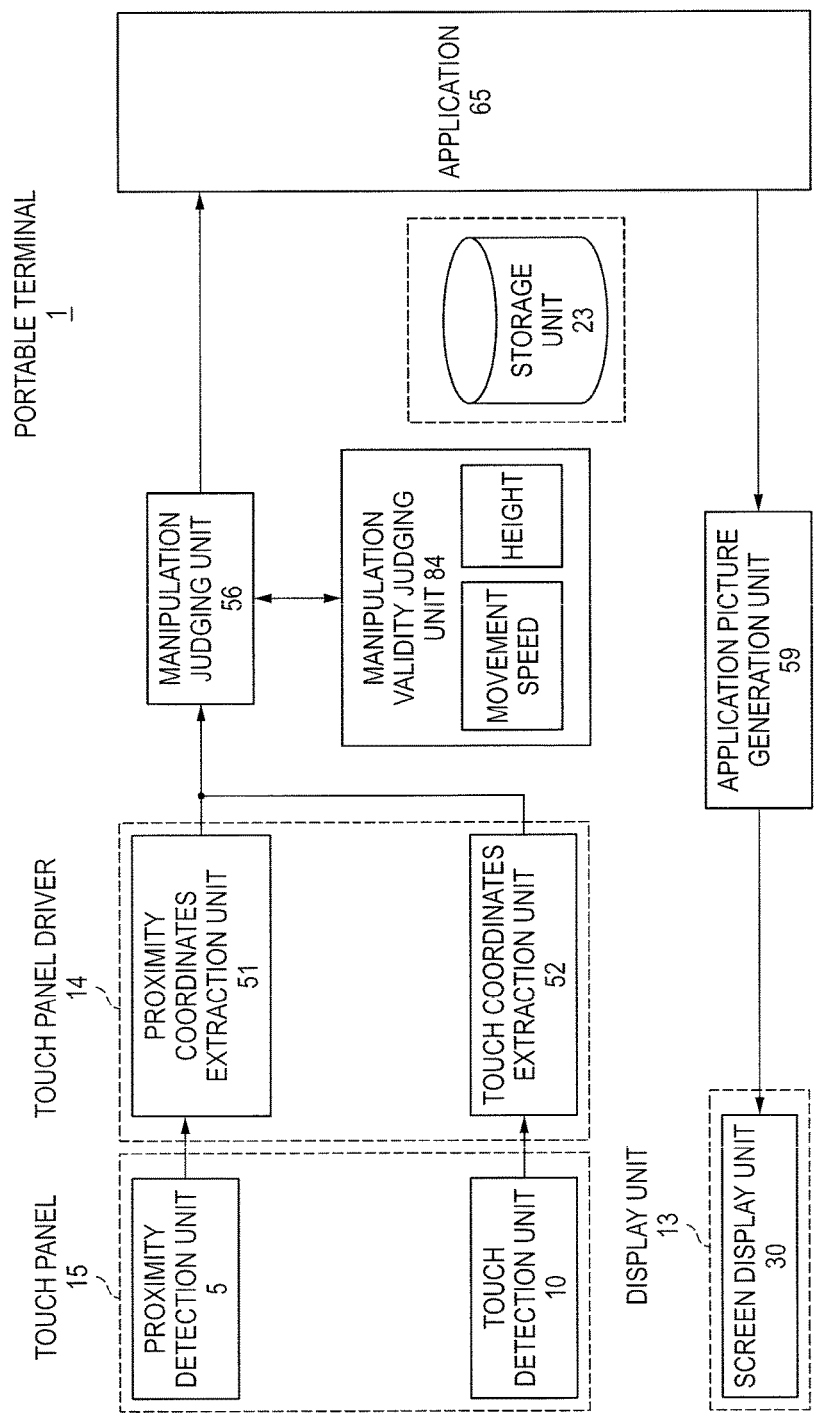
FIG. 2 is a block diagram showing the functional configuration of a portable terminal 1 according to a first embodiment.

The ROM 21 is stored with an application 65 (see FIG. 2) which are installed in the input device 1 and the programs and data according to which the processor 11 performs various kinds of processing of individual units shown in FIG. 2. The ROM 21 is also stored with a table 87 (see FIG. 3; described later).

The RAM 22 operates as a work memory for operation of the processor 11, touch panel driver 14, or the communication control unit 17.

The storage unit 23 is formed using a hard disk or a flash memory incorporated in the portable terminal 1 and stores data acquired or generated by the portable terminal 1 or 1A. The application 65 (see FIG. 2) is stored in the storage unit 23. Instead of being formed using a hard disk or a flash memory, the storage unit 23 may be formed using, for example, an external storage medium (e.g., USB memory) that is connected via a USB (universal serial bus) terminal.

The display unit 13, which has a function of displaying a screen-picture and is formed using, for example, an LCD or an organic EL display, displays data that is output from the processor 11 or the touch panel driver 14 on the screen.

The touch panel driver 14 monitors a user input manipulation on the touch panel 15 by controlling the operation of the touch panel 15. For example, when the touch panel 15 has detected contact of a user finger 68 (see FIG. 4(A)) as a result of a touch manipulation or a slide manipulation or coming into proximity of a user finger as a result of a hover manipulation or a hover slid manipulation, the touch panel driver 14 acquires contact coordinates (x, y) or proximity coordinates (x, y, z) and outputs the information of the coordinates (x, y) or proximity coordinates (x, y, z) to the processor 11, the RAM 22, or the storage unit 23. In the following, the contact coordinates (x, y) will be referred to as touch coordinates (x, y).

Figure 4:
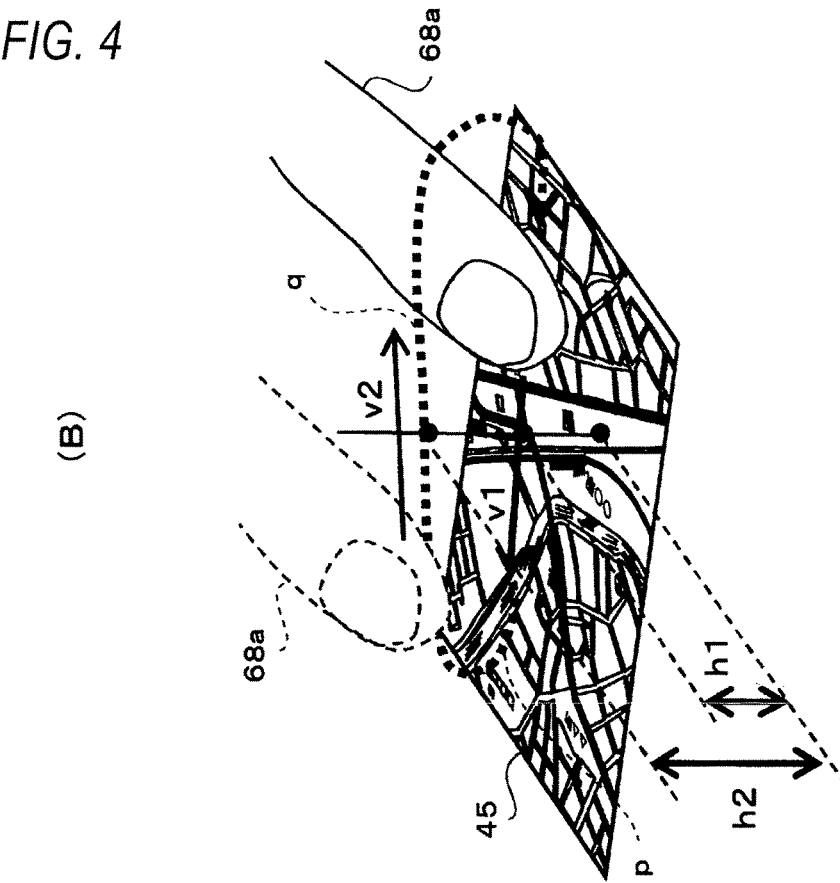
FIGS. 4(A) and 4(B) illustrate a valid manipulation and a return manipulation of successive hover slide manipulations.
Figure 4:
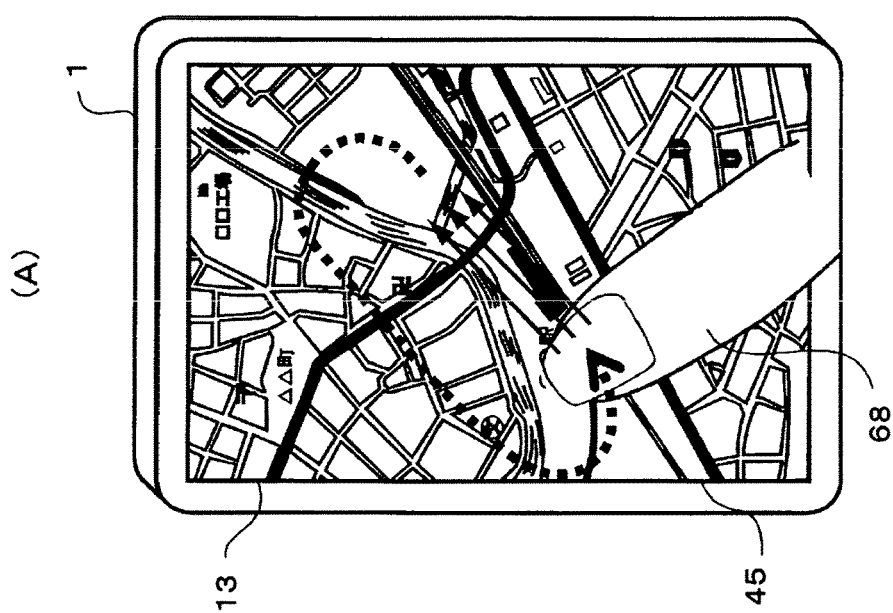

The touch panel 15 is mounted on the screen 45 (see FIG. 4(A)) of the display unit 13 and detects that a user finger 68 has made a touch manipulation or a touch slide manipulation on the horizontal surface of the touch panel 15. Furthermore, the touch panel 15 detects that a user finger 68 has come close to the touch panel 15 as a result of a hover manipulation or a hover slide manipulation.

A specific configuration of the touch panel 15 will not be described because it is disclosed in detail in Patent document 1, for example. The touch panel 15 detects coming into proximity of a finger 68 to the touch panel 15 when the height value z of the finger under a hover manipulation is smaller than or equal to a prescribed value zth or the capacitance which depends on the height value z of the finger is larger than or equal to a prescribed value.

The power control unit 16, which is formed using a power supply source (e.g., battery) of the portable terminal 1, switches between the power-on state and the power-off state of the portable terminal 1 in response to an input manipulation on the touch panel 15. In the power-on state, the power control unit 16 supplies power to the individual units shown in FIG. 1 from the power supply source and thereby renders the portable terminal 1 operational.

The communication control unit 17, which is formed using a wireless communication circuit, transmits data as a processing result of the processor 11 via the transmission/reception antenna 17a and receives, via the transmission/reception antenna 17a, data transmitted from a base station or another communication terminal (not shown). FIG. 1 shows the configuration that is necessary for the description of the embodiments including this embodiment; the portable terminal 1 or 1A according to each embodiment may further include an audio control unit for controlling a call voice, a microphone for picking up a user voice, and a speaker for outputting voice data of the other person on the phone.

(Functional Configuration of Portable Terminal 1 According to Embodiment 1)

Next, the functional configuration of the input device 1 according to a first embodiment will be described with reference to FIG. 2. FIG. 2 is a block diagram showing the functional configuration of the portable terminal 1 according to the first embodiment. In the following description, the term "successive movement manipulations" means, for example, a repetition of hover slide manipulations or touch slide manipulations having straight loci or a repetition of hover slide manipulations or touch slide manipulations having circular or elliptical loci.

In conventional input device, there may occur an event that a finger movement (locus) that need not be detected essentially is detected in detecting successive movement manipulations of a finger having straight, circular, or elliptical loci after detection of coming into proximity of a finger at a spatial position that is spaced from the touch panel which can detect coming into proximity of a finger.

More specifically, when successive movement manipulations (e.g., a repetition of slide manipulations having straight loci) have been made by a finger from an origin that is a spatial position spaced from the touch panel, after a first side manipulation the finger is returned to the original position to make a second slide manipulation.

However, if the finger does not pass spatial positions that are sufficiently spaced from the touch panel in returning to the origin, a signal (e.g., capacitance) detected with a return slide manipulation may exceed a prescribed proximity detection threshold value (capacitance) and thereby be detected by the touch panel. If a return slide manipulation is detected in this manner, the portable terminal may not be able to detect the successive slide manipulations properly, resulting in execution of processing that is not intended by the user. Therefore, when successive movement manipulations are performed on the touch panel by a finger, the probability of acceptance of an erroneous manipulation that does not conform to the intention of a user input manipulation would be high.

In the first embodiment, it is intended to lower the probability of acceptance of an erroneous manipulation of a user when the portable terminal detects successive hover slide manipulations by discriminating between a manipulation that conforms to a user intention (valid manipulation) and a return manipulation that does not conform to the user intension through correct judgments and invalidating return manipulation signals generated as a result of detection of a return manipulation.

The portable terminal 1 shown in FIG. 2 includes a proximity detection unit 5, a touch detection unit 10, a screen display unit 30, a proximity coordinates extraction unit 51, a touch coordinates extraction unit 52, a manipulation judging unit 56, an application picture generation unit 59, a manipulation validity judging unit 84, and the application 65. The portable terminal 1 may further include a memory 40 (see FIG. 2). In this embodiment, the portable terminal 1 may be configured so as not to include the touch detection unit 10 and the touch coordinates extraction unit 52.

The proximity detection unit 5 detects that a user finger has come close to the touch panel 15 as a result of a hover manipulation or a hover slide manipulation. The proximity detection unit 5 outputs, to the proximity coordinates extraction unit 51, a proximity notice to the effect that a finger has come close to the touch panel 15.

The touch detection unit 10 (contact detection unit) detects that a finger has touched the touch panel 15 as a result of a touch manipulation or a touch slide manipulation. The touch detection unit 10 outputs, to the touch coordinates extraction unit 52, a contact notice to the effect that a finger has touched the touch panel 15. The proximity detection unit 5 and the touch detection unit 10 can be formed using the touch panel 15. Although in FIG. 2 the proximity detection unit 5 and the touch detection unit 10 are separate units, they may be formed together in the touch panel 15.

The screen display unit 30, which corresponds to the display unit 13 shown in FIG. 1 and has a function of displaying data on the screen 45, displays, on the screen 45, screen-picture data that is output from the application picture generation unit 59 (described later). The screen-picture data is data of a screen-picture of the application 65 (hereinafter referred to simply as an application screen-picture).

For example, the memory 40, which corresponds to the RAM 22 or the storage unit 23 shown in FIG. 1, stores screen-picture data and image data used by the application 65, image data generated by the application 65, image data received from a base station or another communication terminal (not shown), and pieces of coordinate information of buttons used by the application 65 and pieces of operation information of the application 65 assigned to the respective buttons.

The information of the proximity coordinates (x, y, z) extracted by the proximity coordinates extraction unit 51 or the information of the touch coordinates (x, y) extracted by the touch coordinates extraction unit 52 may be stored temporarily in the memory 40. To avoid unduly complicating the figure, arrows from the proximity coordinates extraction unit 51 and the touch coordinates extraction unit 52 to the memory 40 are not shown in FIG. 2.

The proximity coordinates extraction unit 51 calculates and extracts proximity coordinates (x, y, z) of a finger on or with respect to the touch panel 15 on the basis of a proximity notice that is output from the proximity detection unit 5. The x and y components of the proximity coordinates (x, y, z) are coordinate values representing a position on the touch panel 15, and their z component is a coordinate value representing a distance between the finger and the touch panel 15 in the vertical direction, that is, a coordinate value representing a height z of the finger with respect to the touch panel 15. The proximity coordinates extraction unit 51 outputs the information of the extracted proximity coordinates (x, y, z) to the manipulation judging unit 56.

The touch coordinates extraction unit 52 calculates and extracts touch coordinates (x, y) where a finger has touched the touch panel 15 on the basis of a contact notice that is output from the touch detection unit 10. The touch coordinates extraction unit 52 outputs the extracted touch coordinates (x, y) to the manipulation judging unit 56.

The following description will be made with an assumption that the manipulation judging unit 56 judges whether a user input manipulation is a hover manipulation, a hover slide manipulation, a touch manipulation, a touch slide manipulation, a combination from these manipulations, or successive movement manipulations that are a repletion of hover slide manipulations or touch slide manipulations. However, the invention is not limited to such a case.

The manipulation judging unit 56 receives the information of the proximity coordinates (x, y, z) that is output from the proximity coordinates extraction unit 51 or the information of the touch coordinates (x, y) that is output from the touch coordinates extraction unit 52.

The manipulation judging unit 56 judges whether a hover slide manipulation or a successive hover slide manipulation has been made by an index finger 68a of the user on the basis of the information of the proximity coordinates (x, y, z) that is output from the proximity coordinates extraction unit 51 or the information of the touch coordinates (x, y) that is output from the touch coordinates extraction unit 52.

If judging that a hover slide manipulation or a successive hover slide manipulation has been made by an index finger 68a of the user, the manipulation judging unit 56 outputs a validity judgment instruction containing the information of the proximity coordinates (x, y, z) to the manipulation validity judging unit 84.

The manipulation judging unit 56 outputs, to the application 65, manipulation judgment result information that is output from the manipulation validity judging unit 84.

Based on the validity judgment instruction that is output from the manipulation judging unit 56, the manipulation validity judging unit 84 judges a height of the finger 68 with respect to the touch panel 15 (screen 45) and a movement speed of the finger 68 of the hover slide manipulation or the successive hover slide manipulation of the finger 68.

Figure 3:
FIG. 3 shows example contents of a table 87 which is used for valid manipulation judgment.

Based on the information of the determined height or the determined height and movement speed and the contents of the table 87 shown in FIG. 3, the manipulation validity judging unit 84 judges whether the successive hover slide manipulation is a valid manipulation or a return manipulation. The manipulation validity judging unit 84 outputs a judgment result to the manipulation judging unit 56 as validity judgment result information.

FIG. 3 shows example contents of the table 87 which is used for the valid manipulation judgment. The table 87 may be stored in either the ROM 21 or the storage unit 23. The table 87 shows conditions for determination being a valid manipulation, conditions for determination being a return manipulation, and whether to use a hover signal (proximity signal). In FIG. 3, referring to successive hover slide manipulations illustrated in FIGS. 4(A) and 4(B), it is assumed that h1 represents a finger height value of a valid manipulation, v1 represents a finger movement speed of the valid manipulation, h2 represents a finger height value of a return manipulation, and v2 represents a finger movement speed of the return manipulation.

More specifically, where each of successive hover slide manipulations is to be judged as a valid manipulation or a return manipulation only on the basis of its finger height, the manipulation validity judging unit 84 judges that a manipulation whose finger height value is equal to h1 that is smaller than the value h2 (h1<h2) is a valid manipulation and a manipulation whose finger height value is equal to h2 that is larger than the value h1 (h2>h1) is a return manipulation.

Where each of successive hover slide manipulations is to be judged as a valid manipulation or a return manipulation on the basis of its finger height and movement speed, the manipulation validity judging unit 84 judges that a manipulation whose finger height value is equal to h1 and movement speed value is equal to v1 that is larger than the value v2 (v1>v2) is a valid manipulation and a manipulation whose finger height value is equal to h2 and movement speed value is equal to v2 that is smaller than the value v1 (v2<v1) is a return manipulation.

When judging that the manipulation is a valid manipulation on the basis of manipulation judgment result information supplied from the manipulation validity judging unit 84, the manipulation judging unit 56 informs the application 65 that hover signals of a valid manipulation have been detected and causes the application 65 to perform an operation corresponding to the valid manipulation.

On the other hand, when judging that the manipulation is a return manipulation on the basis of manipulation judgment result information supplied from the manipulation validity judging unit 84, the manipulation judging unit 56 invalidates and discards hover signals detected with the return manipulation. In this case, the manipulation judging unit 56 does not inform the application 65 of the detection of the hover signals of the return manipulation.

The application picture generation unit 59 acquires various data that are necessary for generation of a screen-picture of the application 65 from the memory 40 on the basis of a screen-picture generation instruction that is output from the application 65. The application picture generation unit 59 generates screen-picture data of an application screen-picture of the application 65 using the acquired various data. The application picture generation unit 59 causes the screen display unit 30 to display the contents of the generated screen-picture data.

Although in FIG. 2 the application picture generation unit 59 and the application 65 are drawn as separate units, they may be combined together into new application 65 by giving the functions of the application picture generation unit 59 to the application 65.

(Outline of Operation of Embodiment 1)

FIGS. 4(A) and 4(B) illustrate a valid manipulation and a return manipulation of successive hover slide manipulations. As shown in FIGS. 4(A) and 4(B), in successive hover slide manipulations, an index finger 68a circles plural times in a space that is separated from the screen 45.

A manipulation intended by the user (valid manipulation) of successive hover slide manipulations would be performed in such a manner that as indicated by a locus p shown in FIG. 4(B) the finger height value is kept at h1 that is smaller than h2 and the finger movement speed value is kept at v1 that is larger than v2 while the index finger 68a is slid leftward in the figure being kept close to the screen 45.

On the other hand, a manipulation that is not intended by the user (return manipulation) of the successive hover slide manipulations would be performed in such a manner that as indicated by a locus q shown in FIG. 4(B) the finger height value is kept at h2 that is larger than h1 and the finger movement speed value is kept at v2 that is smaller than v1 while the index finger 68a is returned to the original position of the hover slide manipulation being kept away from the screen 45.

The manipulation validity judging unit 84 may judge whether each of successive hover slide manipulations is valid or not by setting a threshold value $h_{th}$ between the small height value h1 and the large height value h2 and judging that a manipulation is a valid manipulation if its determined height value of the index finger 68a is smaller than the threshold value $h_{th}$. Or the manipulation validity judging unit 84 may judge that a manipulation is a valid manipulation if its determined height value of the index finger 68a is within a range of ±5% (example value) of h1.

The manipulation validity judging unit 84 may judge whether each of successive hover slide manipulations is valid or not by setting a threshold value $v_{th}$ between the small movement speed value v1 and the large movement speed value v2 and judging that a manipulation is a valid manipulation if its determined finger movement speed value is larger than the threshold value $v_{th}$. Or the manipulation validity judging unit 84 may judge that a manipulation is a valid manipulation if its determined movement speed value of the index finger 68a is within a range of ±5% (example value) of v1.

Figure 5:
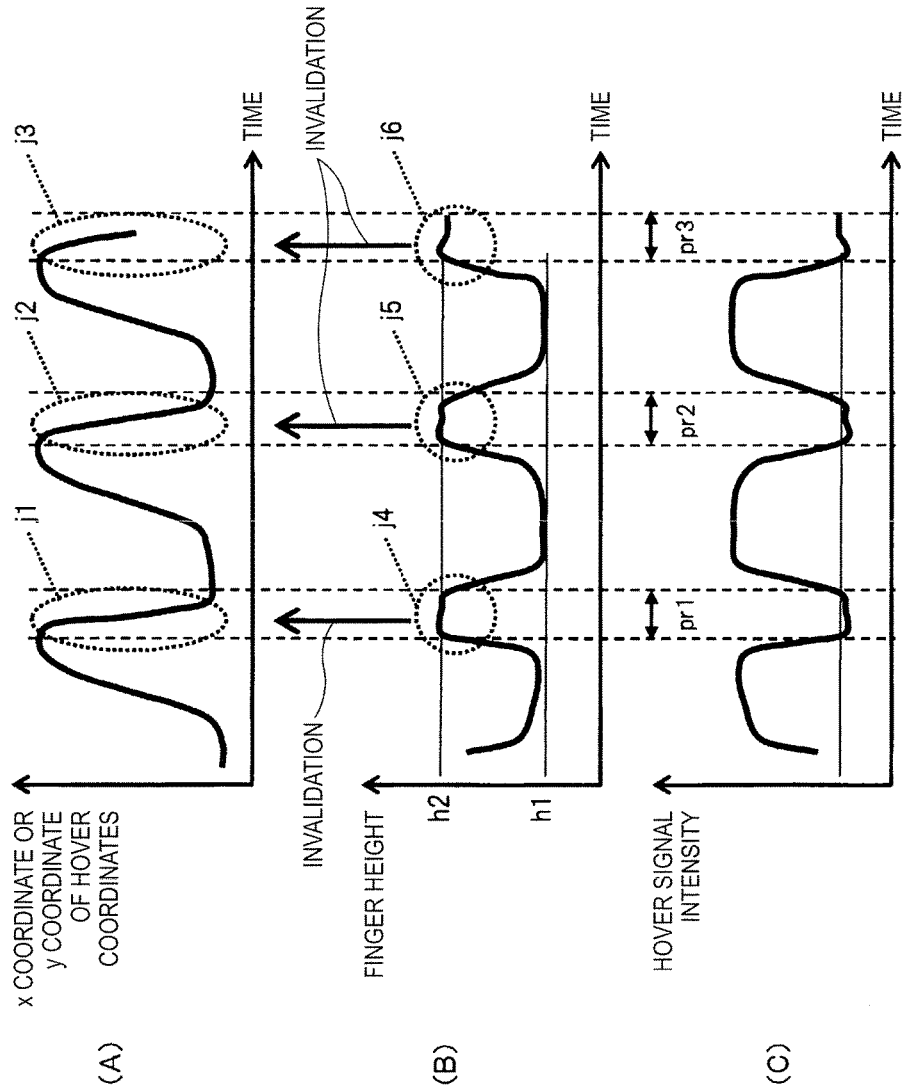
FIG. 5 shows a method for judging a finger height.

FIG. 5 shows a method for judging a finger height. FIG. 5(A) is a graph showing a coordinate variation with time. FIG. 5(B) is a graph showing a finger height variation with time. FIG. 5(C) is a graph showing a hover signal intensity variation (actual measurement values) with time.

When successive hover slide manipulations are performed, as shown in FIG. 5(A) the c coordinate and the y coordinate on the touch panel 15 corresponding to the proximity coordinates (x, y, z) vary approximately periodically as time elapses. In FIG. 5(A), portions enclosed by broken-line frames j1, j2, and j3 correspond to respective return manipulations.

When the successive hover slide manipulations are performed, as shown in FIG. 5(B) the finger height varies periodically between the large value h2 and the small value h1 as time elapses. In FIG. 5(B), for example, the values h1 and h2 may be either values prescribed in advance or proper empirical values determined on the basis of a simulation or an experiment. In FIG. 5(B), portions enclosed by broken-line frames j4, j5, and j6 correspond to the respective return manipulations and the finger height is approximately equal to h2 there.

When the successive hover slide manipulations are performed, as shown in FIG. 5(C) the hover signal intensity varies approximately periodically as time elapses. The hover signal intensity is represented by the capacitance which depends on the distance between the touch panel 15 and the finger (i.e., the height of the finger). Periods pr1, pr2, and pr3 when the hover signal intensity is extremely low correspond to the respective return manipulations. That is, the hover signal intensity is high in the portions corresponding to the valid manipulations and low in the portions corresponding to the return manipulations. The portable terminal 1 can discriminate between valid manipulations and return manipulations of successive hover slide manipulations through correct judgments by judging finger heights (see FIG. 19(B)).

Figure 6:
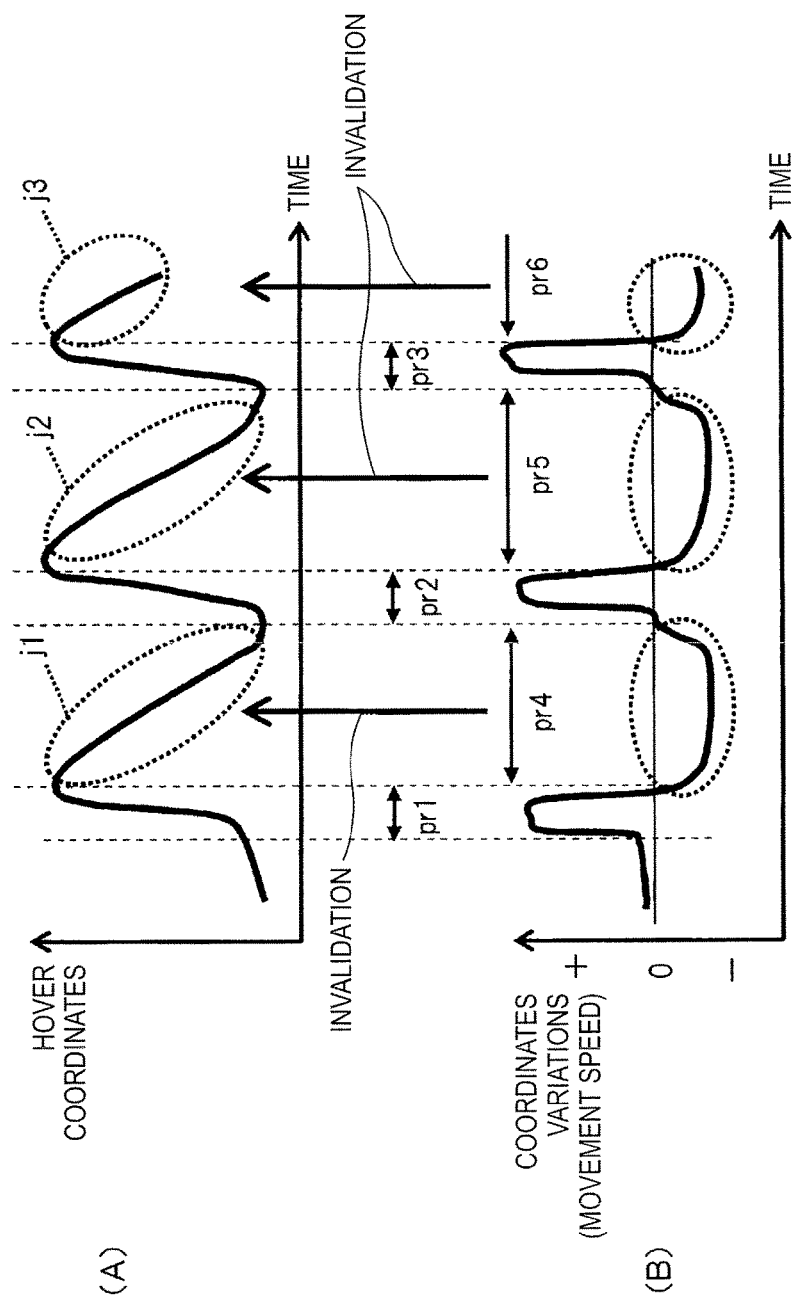
FIG. 6 shows a method for judging a finger movement speed.

FIG. 6 shows a method for judging a finger movement speed. FIG. 6(A) is a graph showing coordinates variations with time. FIG. 6(B) is a graph showing a finger movement speed variation with time.

A finger movement speed is judged on the basis of variations per unit time of proximity coordinates (x, y, z) detected by the touch panel 15, that is, differentiation values of the proximity coordinates. As shown in FIG. 6(A), the proximity coordinates (x, y, z) vary approximately periodically as time elapses. In FIG. 6(A), in portions corresponding to return manipulations (portions enclosed by broken-line frames j1, j2, and j3, that is, portions in periods pr4, pr5, and pr6), the hover coordinates (proximity coordinates) vary more slowly than in periods pr1, pr2, and pr3.

As shown in FIG. 6(B), the variations per unit time of the hover coordinates (proximity coordinates) in the periods pr4, pr5, and pr6, that is, the finger movement speed, have the positive value v1 in the case of valid manipulations and the negative value v2 in the case of return manipulations. Therefore, it is judged that valid manipulations are performed in the periods pr1, pr2, and pr3 and return manipulations are performed in the periods pr4, pr5, and pr6. That is, in the embodiment, signals detected in the periods pr4, pr5, and pr6 are invalidated and discarded.

(Operation of Portable Terminal 1 According to Embodiment 1)

Figure 7:
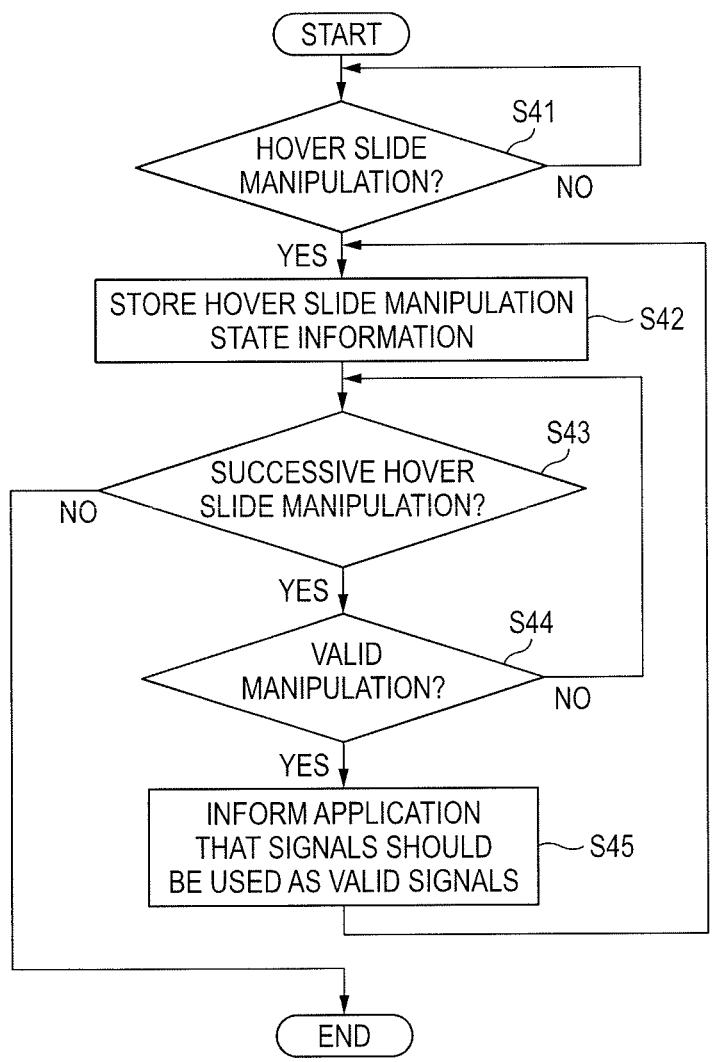
FIG. 7 is a flowchart of a procedure for determining valid manipulations of successive hover slide manipulations in the portable terminal according to the first embodiment.

FIG. 7 is a flowchart of a procedure for determining valid manipulations of successive hover slide manipulations in the portable terminal 1 according to the first embodiment.

Referring to FIG. 7, the manipulation judging unit 56 judges whether a hover slide manipulation has been performed by an index finger 68a of the user on the basis of the information of proximity coordinates (x, y, z) that is output from the proximity coordinates extraction unit 51 (S41). If it is judged that a hover slide manipulation has been performed, the process of the portable terminal 1 moves to step S42.

If judging that a hover slide manipulation has been performed by an index finger 68a of the user, the manipulation judging unit 56 outputs a validity judgment instruction containing the information of the proximity coordinates (x, y, z) to the manipulation validity judging unit 84.

Based on the validity judgment instruction that is output from the manipulation judging unit 56, the manipulation validity judging unit 84 judges a height with respect to the touch panel 15 (screen 45) and a movement speed of the finger 68 of the hover slide manipulation of the user finger 68. The manipulation validity judging unit 84 outputs the information of the determined height or the information of the determined height and movement speed to the manipulation judging unit 56.

The manipulation judging unit 56 stores the hover slide manipulation information that is output from the manipulation validity judging unit 84, that is, the height information and the movement speed information of the index finger 68a, in the RAM 22 or the memory 40 (S42).

After the execution of step S42, the manipulation judging unit 56 judges whether or not a successive hover slide manipulation has been performed by the index finger 68a of the user (S43). If it is judged that a successive hover slide manipulation has not been performed by the index finger 68a of the user, the process of the portable terminal 1 shown in FIG. 7 is finished.

On the other hand, if judging that a successive hover slide manipulation has been performed by the index finger 68a of the user (S43: yes), the manipulation judging unit 56 outputs a validity judgment instruction containing the information of proximity coordinates (x, y, z) to the manipulation validity judging unit 84. Based on the validity judgment instruction that is output from the manipulation judging unit 56, the manipulation validity judging unit 84 judges a height with respect to the touch panel 15 (screen 45) and a movement speed of the finger 68 of the successive hover slide manipulation of the user finger 68 (see FIG. 4(A)).

The manipulation validity judging unit 84 judges whether the successive hover slide manipulation of the finger 68 is a valid manipulation or a return manipulation on the basis of the information of the determined height or the information of the determined height and movement speed and the table 87, and outputs judgment results to the manipulation judging unit 56 as manipulation judgment result information (S44). The manipulation validity judging unit 84 judges a height or a height and movement speed for each hover slide manipulation and makes a valid/return manipulation judgment for each hover slide manipulation.

If judging that the hover slide manipulation is a return manipulation (S44: no), the manipulation validity judging unit 84 invalidates and discards signals (e.g., capacitance values) detected with the hover slide manipulation as judged a return manipulation and outputs, to the manipulation judging unit 56, a notice to the effect that the signals detected with the hover slide manipulation as judged a return manipulation have been discarded. Then the process of the portable terminal 1 returns to step S43.

On the other hand, if judging that the hover slide manipulation is a valid manipulation (S44: yes), the manipulation validity judging unit 84 employs, as valid signals, signals detected with the hover slide manipulation as judged a valid manipulation and communicates information to the effect that a hover slide manipulation has been performed to the application 65 (S45). The application 65 performs an operation corresponding to the hover slide manipulation on the basis of the information that is output from the manipulation judging unit 56. Then the process of the portable terminal 1 returns to step S43.

With the above process, the portable terminal 1 according to the embodiment can correctly judge whether a hover slide manipulation or a successive hover slide manipulation is a valid manipulation or a return manipulation on the basis of a finger height or a finger height and movement speed. By invalidating signals detected with return manipulations, the portable terminal 1 can lower the probability of acceptance of an erroneous manipulation when successive hover slide manipulations are performed.

(Embodiment 2)

When successive movement manipulations as described above (e.g., successive, periodic hover slide manipulations having straight loci) are performed on the touch panel, there may occur an event that a finger touches the touch panel (screen) inadvertently. If a button is displayed at the position that has been touched inadvertently, not only are the successive movement manipulations suspended but also an operation that is not intended by the user is performed. The user can hardly enjoy comfortable manipulations.

In a second embodiment, when an index finger 68a of a user touches the screen 45 (touch panel 15) inadvertently in making successive hover slide manipulations, a touch signal detected as a result of the inadvertent contact is invalidated.

Figure 8:
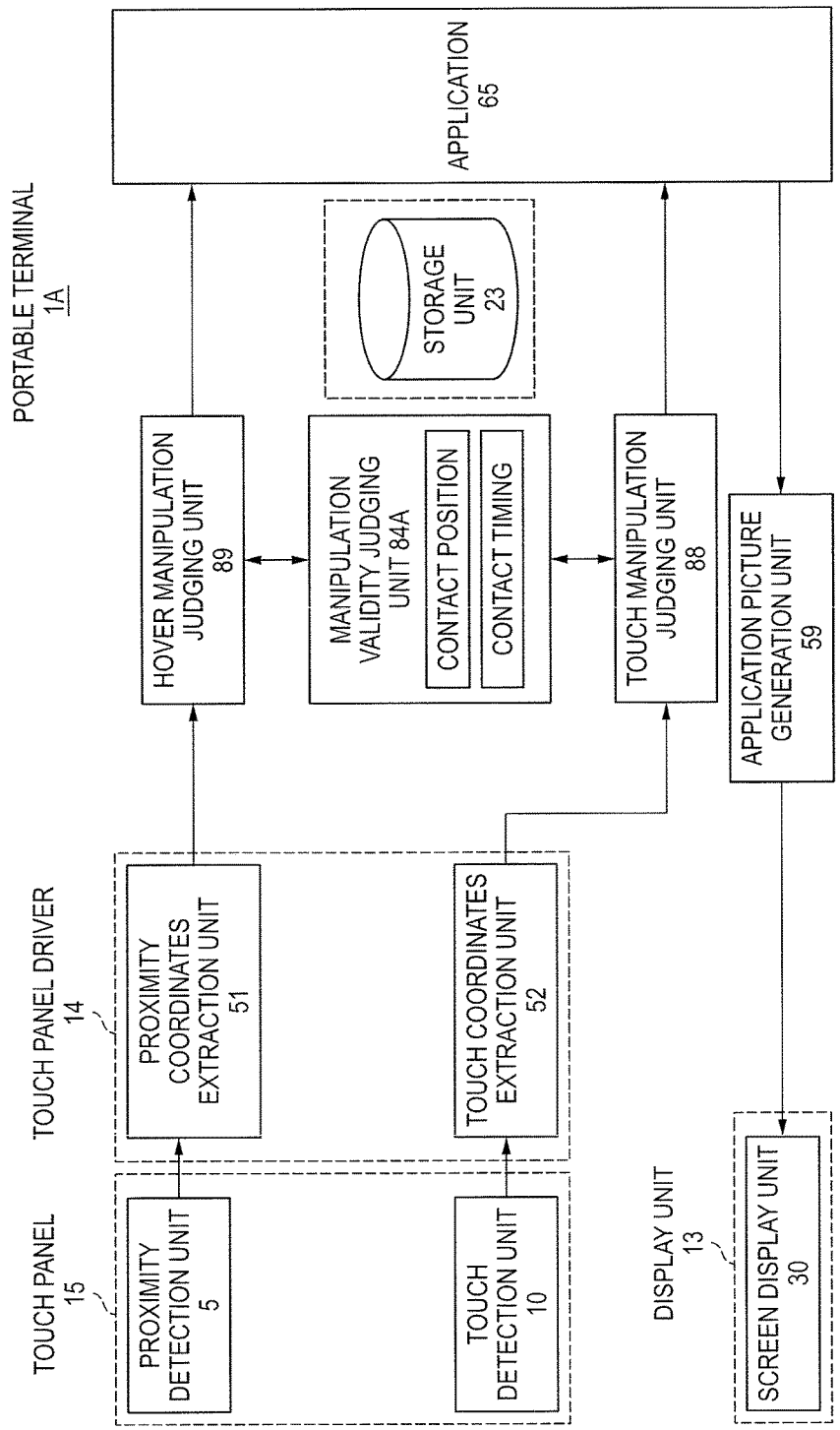
FIG. 8 is a block diagram showing the functional configuration of a portable terminal according to a second embodiment.

FIG. 8 is a block diagram showing the functional configuration of a portable terminal 1A according to the second embodiment. Constituent elements having the same ones in the portable terminal 1 shown in FIG. 2 will be given the same reference symbols as the latter and descriptions therefor will be omitted. Only different constituent elements will be described below.

The portable terminal 1A shown in FIG. 8 includes a proximity detection unit 5, a touch detection unit 10, a screen display unit 30, a proximity coordinates extraction unit 51, a touch coordinates extraction unit 52, a hover manipulation judging unit 89, a touch manipulation judging unit 88, a manipulation validity judging unit 84A, and an application 65.

In the portable terminal 1A shown in FIG. 8, the hover manipulation judging unit 89 is the same in configuration and operation as the manipulation judging unit 56. Therefore, a description of the hover manipulation judging unit 89 will be omitted.

The touch manipulation judging unit 88 judges whether a touch manipulation or a touch slide manipulation has been performed by a user finger on the basis of the information of touch coordinates (x, y) that is output from the touch coordinates extraction unit 52. If judging that a touch manipulation or a touch slide manipulation has been performed, the touch manipulation judging unit 88 outputs, to the manipulation validity judging unit 84A, a touch manipulation validity judgment instruction containing the information of the touch coordinates (x, y) and information to the effect that a finger contact position on the touch panel 15 (screen 45) and contact timing should be calculated.

The touch manipulation judging unit 88 outputs, to the application 65, judgment result information indicating whether a contact position or contact timing (described later) satisfies any of invalidation conditions (described later).

The manipulation validity judging unit 84A calculates a contact position or contact timing that are output from the touch manipulation judging unit 88, and judges whether or not the calculated contact position or contact timing satisfies any of the invalidation conditions (described later). If judging that the calculated contact position or contact timing satisfies any of the invalidation conditions, the touch manipulation judging unit 88 invalidates and discards a signal detected with a touch manipulation corresponding to the contact position or contact timing because the touch manipulation may cause acceptance of an erroneous manipulation.

The manipulation validity judging unit 84A outputs, to the touch manipulation judging unit 88, judgment result information indicating whether any of the invalidation conditions is satisfied or not.

(Outline of Operation of Embodiment 2)

Figure 9:
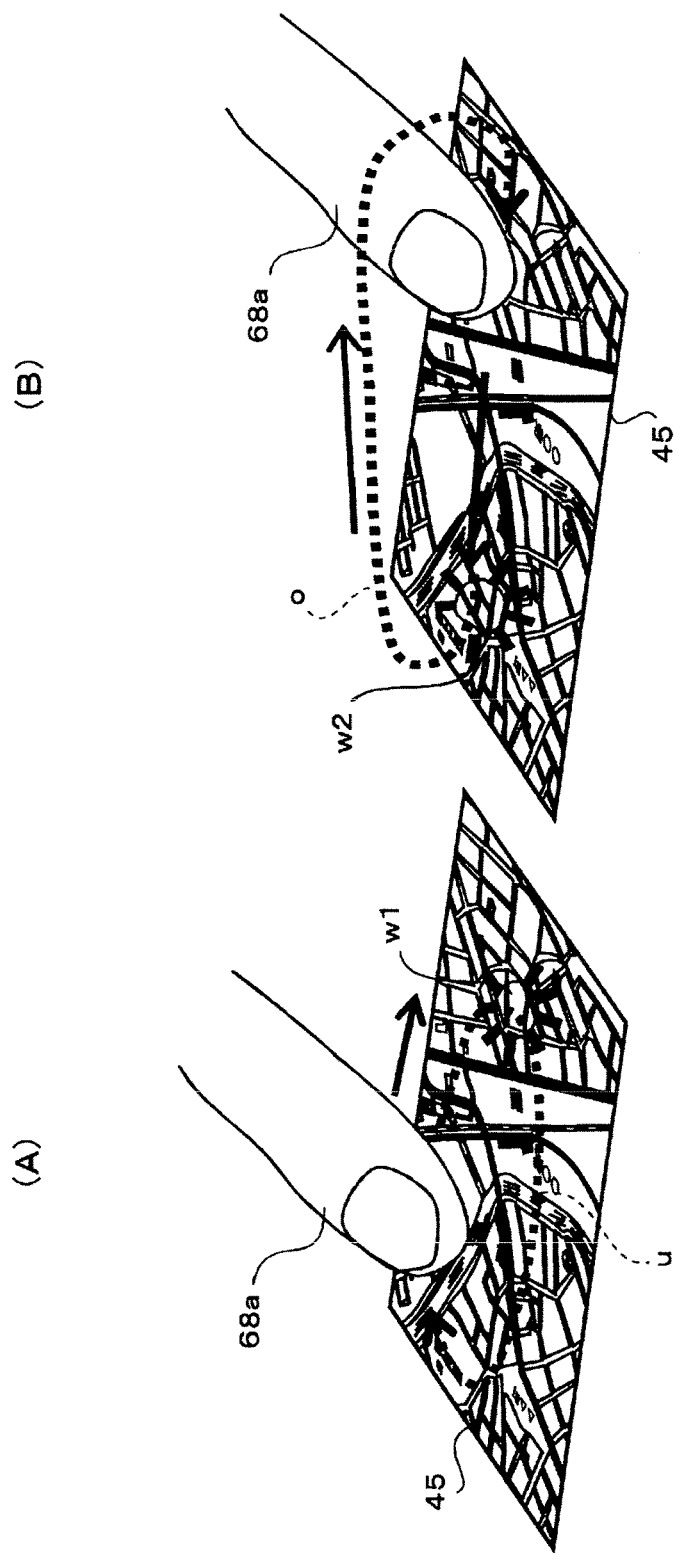
FIGS. 9(A) and 9(B) illustrate an inadvertent touch that is made during successive hover slide manipulations.

FIGS. 9(A) and 9(B) illustrate an inadvertent touch that is made during successive hover slide manipulations. As shown in FIG. 9(A), while an index finger 68a is circled approximately parallel with the touch panel 15 (screen 45) in a space over the touch panel 15 in a proximity state to make hover slide manipulations (see a locus u), there may occur an event that the index finger 68a inadvertently touches the screen 45 at a position w1. The position w1 is a position of a passing point on a locus u of successive hover slide manipulations.

For another example, as shown in FIG. 9(B), while an index finger 68a is circled so as to reciprocate relative to the touch panel 15 (screen 45) in a space over the touch panel 15 in a proximity state to make hover slide manipulations (see a locus o), there may occur an event that the index finger 68a inadvertently touches the screen 45 at a position w2. The position w2 is a position that is close to a position where the index finger 68a turns about in making the reciprocating hover slide manipulations, for example, a start point or an end point of the hover slide manipulations.

As shown in FIGS. 9(A) and 9(B), the manipulation validity judging unit 84A employs the following three invalidation conditions to judge whether or not a touch manipulation has been performed inadvertently on the basis of a calculated contact position or contact timing.

The first invalidation condition is "the contact position is a position on a locus of successive hover slide manipulations" (see FIG. 9(A)). However, with regard to the first invalidation condition, it suffices that a finger make successive hover slide manipulations and it is not necessary that the finger produce a reciprocating locus.

The second invalidation condition is "in hover slide manipulations performed periodically (cycle: 0.5 sec, for example) in such a manner that a finger is reciprocated, the contact position approximately coincides with a position on the touch panel that corresponds to proximity coordinates that the position of the finger that is making a hover slide manipulation should have in a locus." When a finger is making periodic, reciprocating hover slide manipulations on the touch panel, there may occur an event that the user touches the screen (touch panel) in the hover slide manipulation inadvertently. The second invalidation condition is a condition for judging, to be an inadvertent touch, a touch to the screen (touch panel) made by a user inadvertently in making hover slide manipulations.

Figure 11:
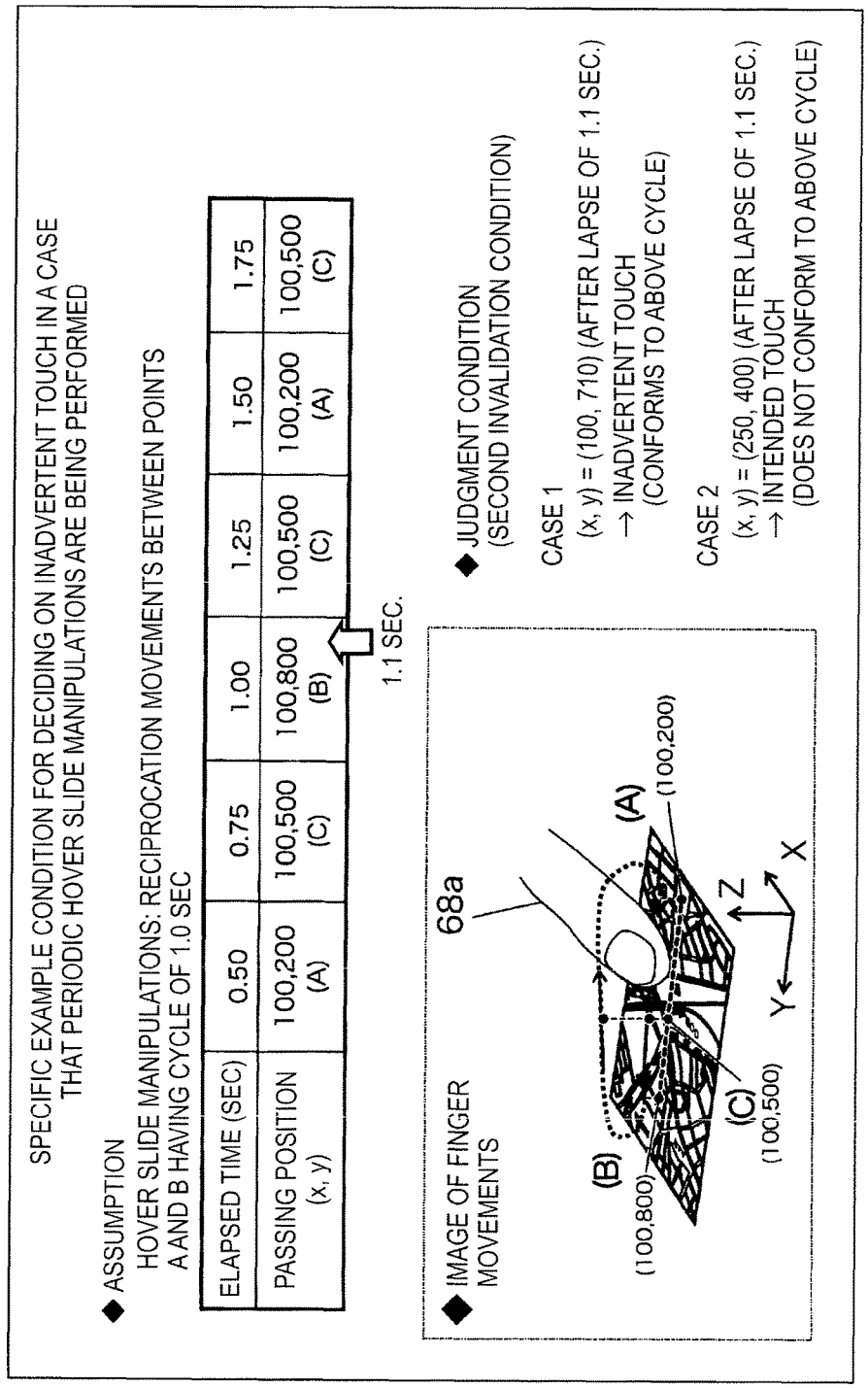
FIG. 11 illustrates a specific example condition for deciding on an inadvertent touch when hover slide manipulations are being performed periodically in such a manner that an index finger is reciprocated.

A specific example of the second invalidation condition will be described with reference to FIG. 11. FIG. 11 illustrates a specific example condition for deciding on an inadvertent touch when hover slide manipulations are being performed periodically in such a manner that an index finger 68a is reciprocated. It is assumed that the index finger 68a is making hover slide manipulations periodically so as to reciprocate once per 1.0 sec between a spatial position (hereafter referred to as a "spatial position over point A") that is spaced from point A (100, 200) in a map image 47 shown in a bottom-left part of FIG. 11 and a spatial position (hereafter referred to as a "spatial position over point B") that is spaced from point B (100, 800) in the map image 47.

It is assumed that point C approximately coincides with a position on the touch panel 15 (screen 45) corresponding to proximity coordinates of one point on a locus of the index finger 68a that is making a hover slide manipulation that passes the spatial position spaced from point A or B.

More specifically, for example, the position on the touch panel 15 (screen 45) corresponding to the passing position (proximity coordinates) of the index finger 68a that is making the hover slide manipulations is the spatial position over point A having the coordinates (100, 200) when the elapsed time from a start of the hover slide manipulations is equal to 0.50 sec, is the spatial position over point C having the coordinates (100, 500) when the elapsed time from is equal to 0.75 sec, is the spatial position over point B having the coordinates (100, 800) when the elapsed time is equal to 1.00 sec, is the spatial position over point C having the coordinates (100, 500) when the elapsed time from is equal to 1.25 sec, is the spatial position over point A having the coordinates (100, 200) when the elapsed time is equal to 1.50 sec, and is the spatial position over point C having the coordinates (100, 500) when the elapsed time is equal to 1.75 sec.

For example, if the index finger 68a touches the touch panel 15 at a position having coordinates (100, 710) when the elapsed time from the start of the hover slide manipulations is equal to 1.1 sec, the position having the coordinates (100, 710) approximately coincides with a position on the touch panel 15 that corresponds to proximity coordinates that the position of the finger that is making the hover slide manipulation should have on the locus. Therefore, the portable terminal 1A judges that the touch made at the coordinates (100, 710) is an inadvertent touch.

On the other hand, for example, if the index finger 68a touches the touch panel 15 at a position having coordinates (250, 400) when the elapsed time from the start of the hover slide manipulations is equal to 1.1 sec, the position having the coordinates (250, 400) does not approximately coincide with a position on the touch panel 15 that corresponds to proximity coordinates that the position of the finger that is making the hover slide manipulation should have on the locus. That is, the second invalidation condition is not satisfied. In this case, the portable terminal 1A judges that a touch manipulation that conforms to the user's own intention has been performed irrespective of the hover slide manipulations, that is, the touch made at the position having the coordinates (250, 400) is not an inadvertent touch. And the portable terminal 1A performs an operation corresponding to the touch made at the position having the coordinates (250, 400).

The third invalidation condition is "the contact position is close to a position where the finger turns about in making reciprocating hover slide manipulations" (see FIG. 9(B)). For example, in the example of FIG. 9(B), the index finger 68a touches the screen 45 at the contact position w2. However, depending on the locus of the reciprocating manipulations of the index finger 68a, in making the reciprocating manipulations, the index finger 68a may touch the screen 45 on the opposite side to the side where it turns about. Therefore, when the first invalidation condition or the second invalidation condition is satisfied, the probability that an inadvertent manipulation has been made would be even higher if the third invalidation condition is satisfied. The invalidation conditions are not limited to the above-described ones, and various other invalidation conditions can be employed.

(Operation of Portable Terminal 1A According to Embodiment 2)

Figure 10:
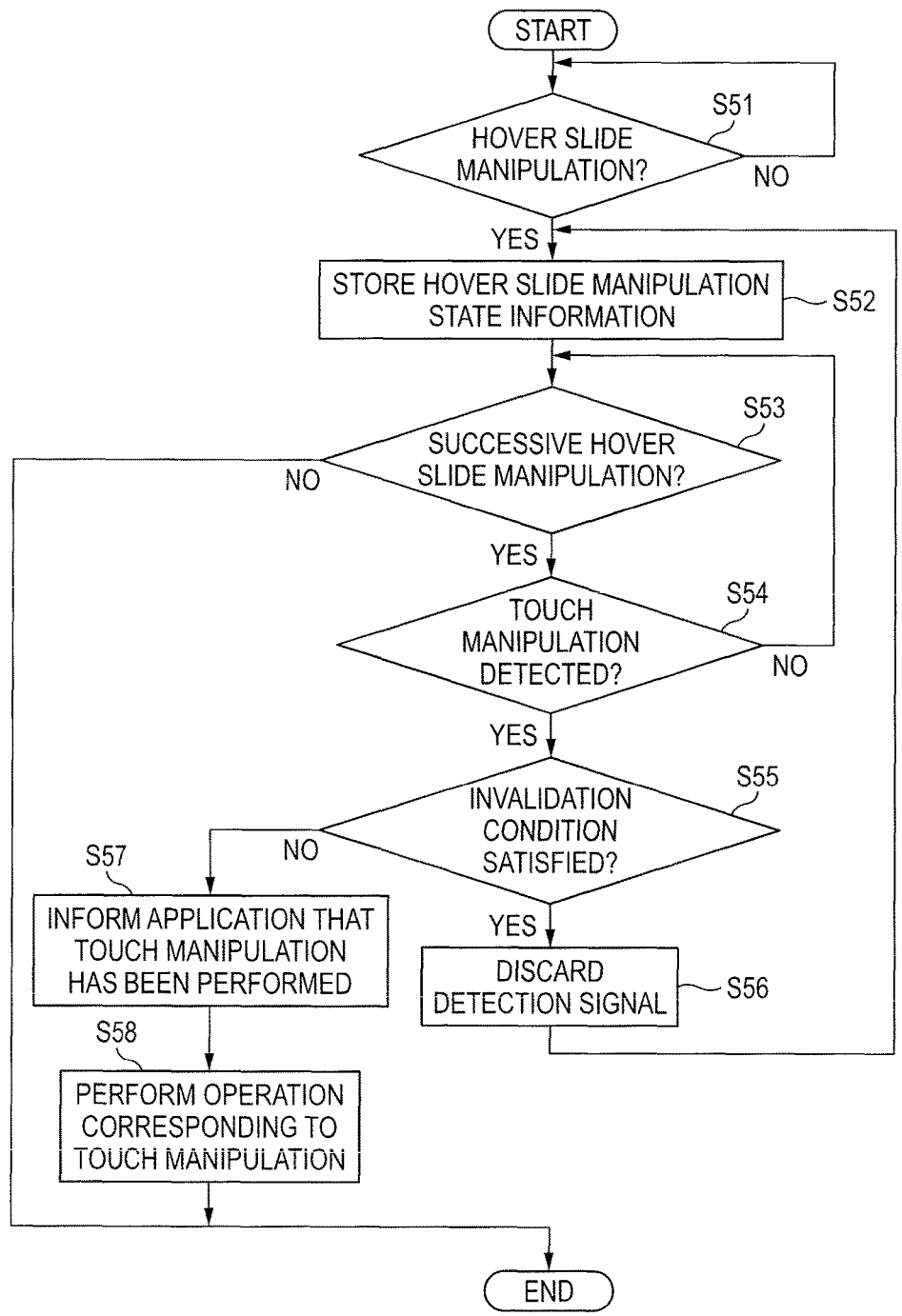
FIG. 10 is a flowchart of a procedure for determining valid manipulations of successive hover slide manipulations in the portable terminal according to the second embodiment.

FIG. 10 is a flowchart of a procedure for determining valid manipulations of successive hover slide manipulations in the portable terminal 1A according to the second embodiment.

Referring to FIG. 10, the hover manipulation judging unit 89 judges whether a hover slide manipulation has been performed by an index finger 68a of the user on the basis of the information of proximity coordinates (x, y, z) that is output from the proximity coordinates extraction unit 51 (S51). If it is judged that a hover slide manipulation has been performed, the process of the portable terminal 1A moves to step S52.

If judging that a hover slide manipulation has been performed by an index finger 68a of the user, the hover manipulation judging unit 89 outputs a hover manipulation validity judgment instruction containing the information of the proximity coordinates (x, y, z) to the manipulation validity judging unit 84A.

Based on the hover manipulation validity judgment instruction that is output from the hover manipulation judging unit 89, the manipulation validity judging unit 84A judges a height with respect to the touch panel 15 (screen 45) and a movement speed of the finger 68a of the hover slide manipulation of the user finger 68a. The manipulation validity judging unit 84A outputs the information of the determined height or the information of the determined height and movement speed to the hover manipulation judging unit 89.

The hover manipulation judging unit 89 stores the hover slide manipulation information that is output from the manipulation validity judging unit 84A, that is, the height information and the movement speed information of the index finger 68a, in the RAM 22 or the memory 40 (S52).

After the execution of step S52, the manipulation judging unit 89 judges whether or not a successive hover slide manipulation has been performed by the index finger 68a of the user (S53). If it is judged that a successive hover slide manipulation has not been performed by the index finger 68a of the user, the process of the portable terminal 1A shown in FIG. 10 is finished.

On the other hand, if judging that a successive hover slide manipulation has been performed by the index finger 68a of the user (S53: yes), the touch manipulation judging unit 88 judges whether or not a touch manipulation has been performed by, for example, the same index finger 68a as or a different finger from the finger that has made the hover slide manipulation on the basis of the information of touch coordinates (x, y) that is output from the touch coordinates extraction unit 52 (S54). If it is judged that a touch manipulation has not been performed, the process of the portable terminal 1A is returned to step S53.

if judging that a touch manipulation has been performed by, for example, the same index finger 68a as or a different finger from the finger that has made the hover slide manipulation (S54: yes), the touch manipulation judging unit 88 outputs, to the manipulation validity judging unit 84A, a touch manipulation validity judgment instruction containing the information of the touch coordinates (x, y) and information to the effect that a finger contact position on the touch panel 15 (screen 45) and contact timing should be calculated.

The manipulation validity judging unit 84A calculates a contact position and contact timing that are output from the touch manipulation judging unit 88, and judges whether the calculated contact position or contact timing satisfies any of the invalidation conditions (described later) (S55). The manipulation validity judging unit 84A outputs a judgment result to the touch manipulation judging unit 88.

If it is judged that any of the invalidation conditions is satisfied (S55: yes), the touch manipulation judging unit 88 invalidates and discards a signal detected with the touch manipulation because the touch manipulation corresponding to the contact position or the contact timing may be an inadvertent manipulation (S56).

If it is judged that none of the invalidation conditions is satisfied (S55: no), the touch manipulation judging unit 88 outputs, to the application 65, information to the effect that a touch manipulation has been performed and the information of the touch coordinates (x, y) (S57). The application 65 performs an operation corresponding to the touch manipulation on the basis of the information that is output from the touch manipulation judging unit 88 (S58). For example, if a button is displayed at the touch coordinates (x, y) where the touch manipulation has been made, the application performs an operation corresponding to the button.

With the above process, when a touch manipulation is made by the same finger as or a different finger from a finger that has made a successive hover slide manipulation, the portable terminal 1A according to the embodiment judges whether or not any of the invalidation conditions is satisfied on the basis of a contact position or contact timing of the touch manipulation.

The portable terminal 1A invalidates and discards a signal detected with the touch manipulation if any of the invalidation conditions is satisfied. Thus, the portable terminal 1A can prevent acceptance of an erroneous manipulation due to an event that the same finger as or a different finger from a finger that is making hover slide manipulations comes into contact with the screen 45 (touch panel 15). Therefore, even if a button is defined at the position on the screen 45 (touch panel 15) where a touch manipulation has been made, the portable terminal 1A can prevent activation of an operation that is not intended by the user because it invalidates a signal that is detected when any of the invalidation conditions is satisfied.

Furthermore, since a touch manipulation made during hover slide manipulations is invalidated if any of the above-described three invalidation conditions is satisfied, the appropriateness of the invalidation can be secured.
(Background of Conception of Third and Following Embodiments)

Before the description of third and following embodiments, a description will be made of problems that are associated with an input manipulation that is made on a touch panel capable of detecting only a touch manipulation. A flick manipulation that is an input manipulation different from a touch manipulation may be performed on a touch pane. The flick manipulation is a manipulation that a finger flicks (snaps or quickly slides) after making a touch manipulation on the screen. The flick manipulation makes it possible to easily scroll a content displayed on the screen. Therefore, in touch panels capable of detecting only a touch manipulation, if a button exists at a position where a finger has come into contact with the screen to make a flick manipulation, the manipulation may be detected erroneously as a touch manipulation on the button if the finger leaves the button without making almost no movement from it in a state that the finger is in contact with the screen.

For another example, if a palm or a finger of a user touches the screen unconsciously when, for example, he or she is gripping the body of a potable terminal and a button exists at a position having a largest capacitance variation, that is, the center of the contact portion, the touch panel capable of detecting only a touch manipulation may erroneously detect the touch as a touch manipulation on the button though the user has not touch-manipulated the button intentionally.

For example, the coordinates processing device of Referential Patent document 1 is known as a prior art technique for lowering the probability of erroneous detection even when the user has made a contact action unconsciously or an input manipulation intended by the user is not detected.

(Referential Patent document 1) JP-A-2010-49469

In the coordinates processing device of Referential Patent document 1, coordinates points represented by sets of coordinates of command positions of a commanding input of a user are arranged in time-series frames and inter-frame correspondence between the coordinates points is traced. Furthermore, in the coordinates processing device, an operation of the commanding input of the user is determined on the basis of a tracing result of transitions between states (defined in advance as user commanding input states) including a commanding input start waiting state (first state), a movement state of the command position that is moved by a commanding input (second state), and a commanding input end waiting state (third state). Configured in this manner, the coordinates processing device enables a correct continuous operation corresponding to a drag manipulation, a rotation manipulation, or the like.

For another example, the position detecting device and method of Referential Patent document 2 is known as a prior art technique in which a contact detection signal produced by a palm when an input manipulation is performed on a touch panel capable of detecting only a touch manipulation using a conductive stylus is disregarded.

(Referential Patent document 2) US2012/0007614A

In the position detecting device and method of Referential Patent document 2, a contact detection signal that is detected as a result of contact of a palm to a touch panel when a user makes an input manipulation on the touch panel using a conductive stylus is disregarded and a contact detection signal detected for the stylus is employed.

However, it is considered that the above-described Referential Patent documents 1 and 2 do not suppose detection of coming into proximity of a detection target (e.g., a finger or a conductive stylus) to a touch panel. In conventional touch panels, a contact position or a contact continuation time from a timer count is calculated on the basis of a contact detection signal (e.g., capacitance value or touch coordinates) detected at the time of a touch manipulation. Therefore, portable terminals incorporating a conventional touch panel judge an input manipulation made by a user on the basis of an output from the touch panel. As described above, an input manipulation may be detected erroneously in conventional touch panels that use only a contact detection signal generated at the time of contact.

(Embodiment 3)

In the third embodiment, which has been conceived on the above-described background of the third and following embodiments, an example portable terminal will be described which correctly discriminates between a touch manipulation and a flick manipulation as intentional manipulations of a user and thereby lowers the probability of occurrence of erroneous detection of an input manipulation.

In each of the following embodiments, proximity coordinates (x, y, z) or a value of capacitance between a touch panel 15 and a finger, palm, or hand that is obtained when coming into proximity of the finger, palm, or hand to the touch panel 15 is detected by a proximity detection unit 5 can be referred to as a "proximity detection signal." For example, a description will be made in which proximity coordinates (x, y, z) will be referred to as a "proximity detection signal." However, it is also possible to make a description in which a capacitance value is referred to as a "proximity detection signal."

Likewise, touch coordinates (x, y) or a value of capacitance between the touch panel 15 and a finger, palm, or hand that is obtained when contact of the finger, palm, or hand to the touch panel 15 is detected by a touch detection unit 10 can be referred to as a "contact detection signal." For example, a description will be made in which touch coordinates (x, y) will be referred to as a "contact detection signal." However, it is also possible to make a description in which a capacitance value is referred to as a "contact detection signal."

Figure 12:
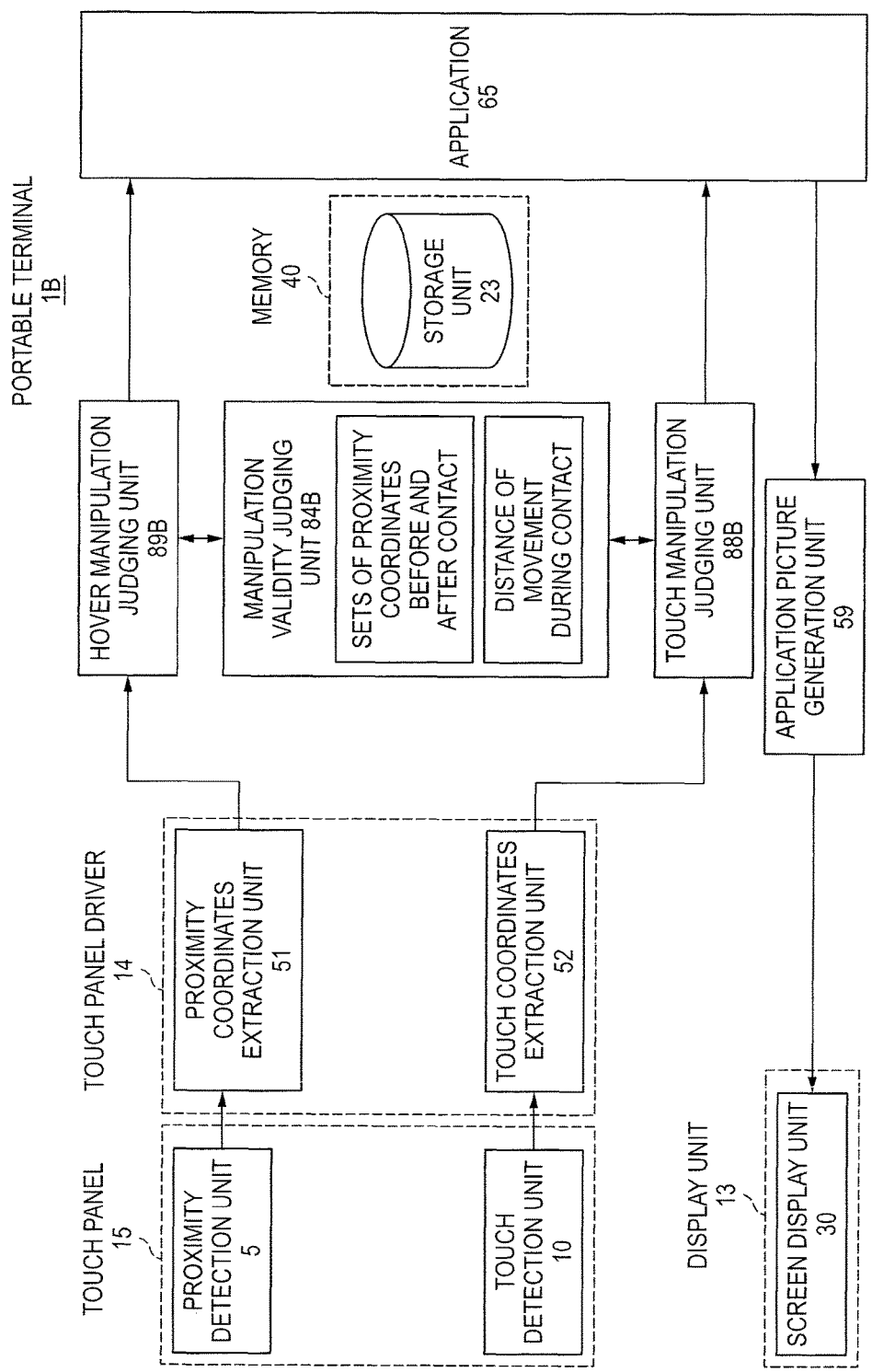
FIG. 12 is a block diagram showing the functional configuration of a portable terminal according to a third embodiment.

FIG. 12 is a block diagram showing the functional configuration of a portable terminal according to the third embodiment. Constituent elements having the same ones in the portable terminal 1 shown in FIG. 2 will be given the same reference symbols as the latter and descriptions therefor will be omitted. Only different constituent elements will be described below.

The portable terminal 1B shown in FIG. 12 includes a proximity detection unit 5, a touch detection unit 10, a screen display unit 30, a proximity coordinates extraction unit 51, a touch coordinates extraction unit 52, a hover manipulation judging unit 89B, a touch manipulation judging unit 88B, a manipulation validity judging unit 84B, and an application 65. The portable terminal 1B may also include a memory 40 or the storage unit 23.

The hover manipulation judging unit 89B judges whether a hover manipulation or a hover slide manipulation has been made by, for example, an index finger 68a of the user on the basis of the information of proximity coordinates (x, y, z) (proximity detection signal) that is output from the proximity coordinates extraction unit 51. If judging that a hover manipulation or a hover slide manipulation has been made by an index finger 68a of the user, the hover manipulation judging unit 89B outputs the information of the proximity coordinates (x, y, z) to the manipulation validity judging unit 84B.

The touch manipulation judging unit 88B judges whether a user finger, palm, or hand, for example, has contacted the touch panel 15 on the basis of the information of touch coordinates (x, y) (contact detection signal) that is output from the touch coordinates extraction unit 52. If judging that a user finger, palm, or hand has contacted the touch panel 15, the touch manipulation judging unit 88B outputs, to the manipulation validity judging unit 84B, the information of the touch coordinates (x, y) and a judgment instruction to judge whether the contact is of a touch manipulation or a flick manipulation on the basis of the touch coordinates (x, y) and proximity coordinates (x, y, z) obtained before and after the contact.

If the judgment result of the manipulation validity judging unit 84B is a "touch manipulation," the touch manipulation judging unit 88B outputs, to the application 65, the information of the touch coordinates (x, y) corresponding to the touch manipulation. If the judgment result of the manipulation validity judging unit 84B is a "flick manipulation," the touch manipulation judging unit 88B outputs, to the application 65, information to the effect that a flick manipulation has been made whose starting point is the position of the touch coordinates (x, y) that are output from the touch coordinates extraction unit 52.

The manipulation validity judging unit 84B judges whether the input manipulation that has caused the detection of the touch coordinates (x, y) is a touch manipulation or a flick manipulation on the basis of the touch coordinates (x, y) and the proximity coordinates (x, y, z) obtained before and after the contact using the information of the proximity coordinates (x, y, z) that is output from the hover manipulation judging unit 89B and the information of the touch coordinates (x, y) and the judgment instruction that are output from the touch manipulation judging unit 88B.

Figure 13:
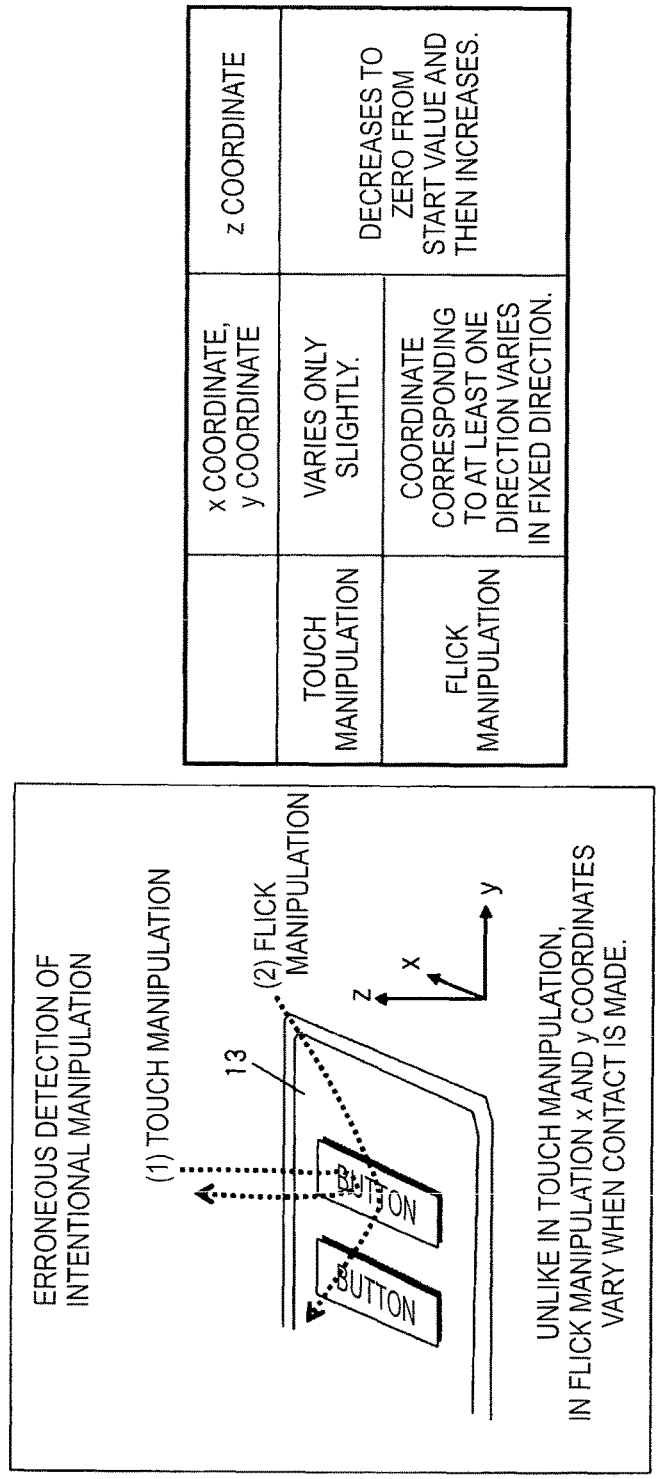
FIG. 13(A) illustrates a difference between a touch manipulation and a flick manipulation.
FIG. 13(B) illustrates differences between sets of x, y and z coordinates of a touch manipulation and those of a flick manipulation.

Next, a method by which the manipulation validity judging unit 84B judges whether an input manipulation that has caused detection of touch coordinates (x, y) is a touch manipulation or a flick manipulation will be described with reference to FIG. 13. FIG. 13(A) illustrates a difference between a touch manipulation and a flick manipulation. FIG. 13(B) illustrates differences between sets of x, y and z coordinates of a touch manipulation and those of a flick manipulation. A method for judging whether a finger that has contacted the right-hand button (as viewed in the figure) of two buttons displayed on the screen of the display unit 13 (see FIG. 13(A)) is a touch manipulation or a flick manipulation will be described below.

As shown in FIG. 13(A), between the touch manipulation and the flick manipulation as intentional manipulations of a user, in many cases the flick manipulation causes a movement that is longer than or equal to a prescribed threshold value (hereinafter referred to as a first threshold value D1) after contact of a finger to the screen. If a movement that is longer than or equal to the prescribed threshold value is detected, it can be judged clearly that a flick manipulation has been made. Furthermore, each kind of manipulation has following features in the locus of the proximity coordinates (x, y, z) of a finger (see FIG. 13(B)). The first threshold value D1 may have either the same value or different values in the x-axis direction and the y-axis direction.

First, in each of the touch manipulation and the flick manipulation, since a finger approaches the screen from a distant position, contacts the screen, and then leaves the screen, the z coordinate decreases to zero from a value at a start of the manipulation and then increases. Since the z coordinates varies in the same manner in each of the touch manipulation and the flick manipulation, it is difficult to discriminate between the touch manipulation and the flick manipulation using z coordinate values.

On the other hand, each of the x coordinate and the y coordinate varies differently in the touch manipulation and the flick manipulation. That is, whereas in the touch manipulation each of the x coordinate and the y coordinate varies only slightly, in the flick manipulation the x coordinate, the y coordinate, or both of them varies in a fixed direction or vary in fixed directions. In the flick manipulation, the coordinates vary depending on its direction.

For example, if as shown in FIG. 13(A) a flick manipulation is performed in a direction that is parallel with neither the x axis nor the y axis, during the flick manipulation the x coordinate and the y coordinate of the detected proximity coordinates vary in fixed directions determined by the direction of the flick manipulation. That is, each of the x coordinate and the y coordinate varies by more than or equal to a prescribed value (hereinafter referred to as a second threshold value D2). The second threshold value D2 may have either the same value or different values in the x-axis direction and the y-axis direction.

When a flick manipulation is performed parallel with the x axis, during the flick manipulation the x coordinate of the detected proximity coordinates varies by more than or equal to the second threshold value D2. When a flick manipulation is performed parallel with the y axis, during the flick manipulation the y coordinate of the detected proximity coordinates varies by more than or equal to the second threshold value D2.

As described above, the manipulation validity judging unit 84B judges that a flick manipulation has been performed if the x coordinate, the y coordinate, or both of them of the proximity coordinates (x, y, z) has or have varied by more than or equal to the second threshold value D2 from before contact to after that. The manipulation validity judging unit 84B judges that a touch manipulation has been performed if the x coordinate, the y coordinate, or both of them of the proximity coordinates (x, y, z) has or have varied by less than the second threshold value D2 from before contact to after that.

(Operation of Portable Terminal 1B According to Embodiment 3)

Figure 14:
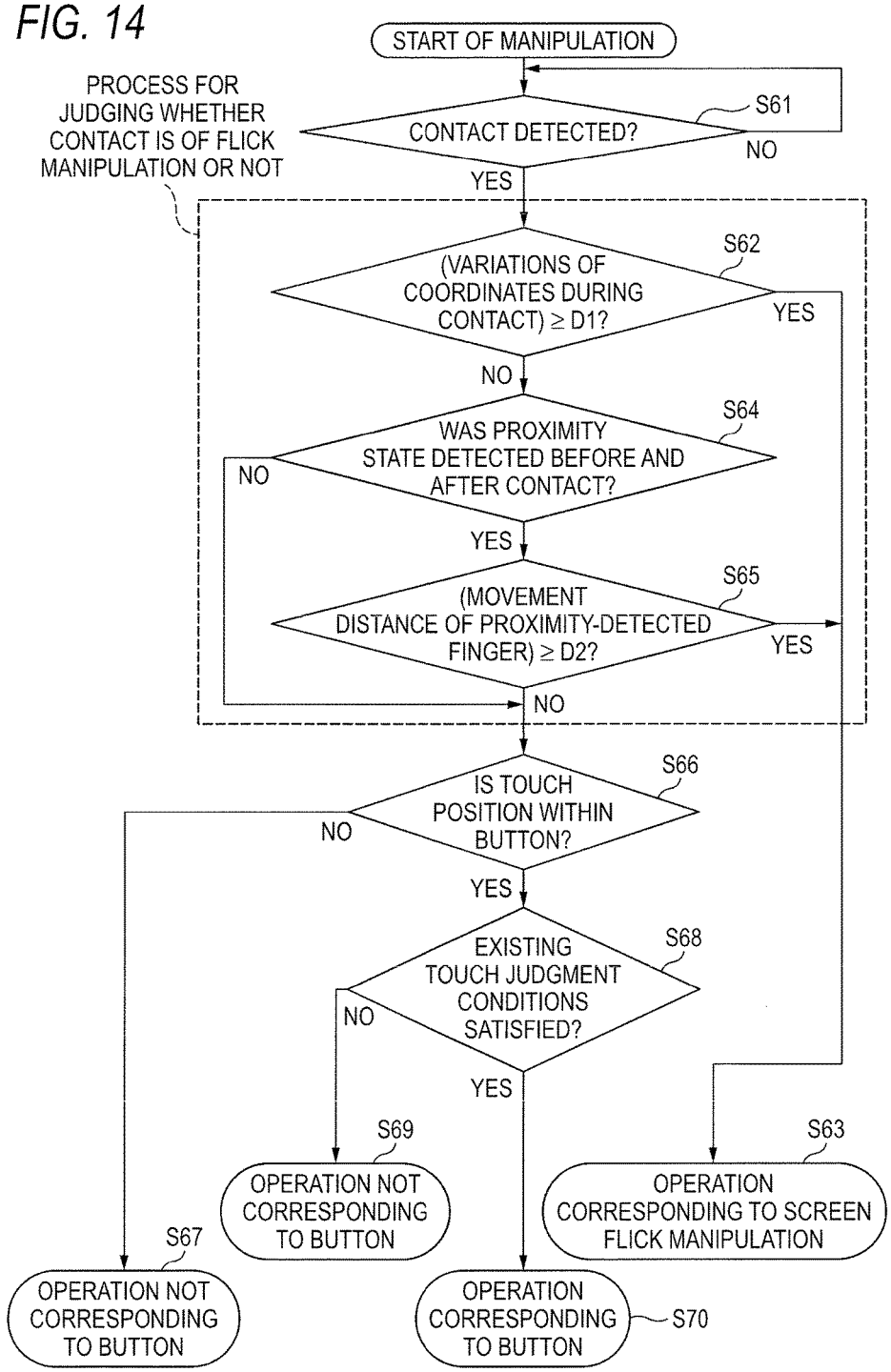
FIG. 14 is a flowchart of a procedure for discriminating between a flick manipulation and a touch manipulation in the portable terminal according to the third embodiment.

FIG. 14 is a flowchart of a procedure for discriminating between a flick manipulation and a touch manipulation in the portable terminal according to the third embodiment.

Referring to FIG. 14, the hover manipulation judging unit 89B judges whether a hover manipulation or a hover slide manipulation has been made by, for example, an index finger 68a of the user on the basis of the information of proximity coordinates (x, y, z) (proximity detection signal) that is output from the proximity coordinates extraction unit 51. If judging that a hover manipulation or a hover slide manipulation has been made by an index finger 68a of the user, the hover manipulation judging unit 89B outputs the information of the proximity coordinates (x, y, z) to the manipulation validity judging unit 84B.

If receiving, from the touch coordinates extraction unit 52, information of touch coordinates (x, y) produced by contact of an index finger 68a of the user (S61: yes), the touch manipulation judging unit 88B outputs, to the manipulation validity judging unit 84B, the information of the touch coordinates (x, y) and a judgment instruction to judge whether the contact is of a touch manipulation or a flick manipulation on the basis of the touch coordinates (x, y) and proximity coordinates (x, y, z) obtained before and after the contact. The manipulation validity judging unit 84B judges whether or not the x coordinate and the y coordinate of the index finger 68a have varied by more than or equal to the first threshold value D1 from before the contact to after that on the basis of the judgment instruction and the touch coordinates (x, y) that are output from the touch manipulation judging unit 88B (S62).

Steps S62, S64, and S65 in FIG. 14 correspond to a process for judging whether or not the contact is of a flick manipulation. It is assumed here that a flick manipulation is performed in a direction that is parallel with neither the x axis nor the y axis.

If judging that the x coordinate and the y coordinate of the index finger 68a have varied by more than or equal to the first threshold value D1 during the contact (S62: yes), the manipulation validity judging unit 84B outputs, to the touch manipulation judging unit 88B, a judgment result to the effect that a flick manipulation has been made. If the judgment result of the manipulation validity judging unit MB is a "flick manipulation," the touch manipulation judging unit 88B outputs, to the application 65, information to the effect that a flock manipulation has been performed whose starting point is the position of the touch coordinates (x, y) that are output from the touch coordinates extraction unit 52. The application 65 performs an operation corresponding to the flick manipulation (S63), and outputs a result of the operation corresponding to the flick manipulation to the application picture generation unit 59. The application picture generation unit 59 (display control unit) displays the operation result received from the application 65 on the screen of the display unit 13 (screen display unit 30).

If judging that the x coordinate and the y coordinate of the index finger 68a have varied by less than the first threshold value D1 during the contact (S62: no), then the manipulation validity judging unit 84B judges whether or not the index finger 68a being in a proximity state was detected before and after the contact by the proximity detection unit 5 (S64). More specifically, the manipulation validity judging unit 84B judges that the index finger 68a being in a proximity state was detected before and after the contact by the proximity detection unit 5 if it acquired information of proximity coordinates (x, y, z) from the hover manipulation judging unit 89B before and after the contact. If it is judged that the index finger 68a being in a proximity state was not detected before and after the contact by the proximity detection unit 5 (S64: no), the process of the portable terminal 1B moves to step S66 with a judgment that a flick manipulation has not been made by the index finger 68a of the user.

If judging that the index finger 68a being in a proximity state was detected before and after the contact by the proximity detection unit 5 (S64: yes), then the manipulation validity judging unit 84B judges whether the proximity-detected index finger 68a has moved by more than or equal to the second threshold value D2 from before the contact to the screen to after that (S65). If judging that the proximity-detected index finger 68a has moved, that is, the x coordinate and the y coordinates have varied, by more than or equal to the second threshold value D2 from before the contact to the screen to after that (S65: yes), the manipulation validity judging unit 84B outputs, to the touch manipulation judging unit 88B, a judgment result to the effect that a flick manipulation has been made. After the judgment result to the effect that a flick manipulation is input to the touch manipulation judging unit 88B, the same process (description omitted here) as described above is executed (S63).

If it is judged that the proximity-detected index finger 68a has moved, that is, the x coordinate and the y coordinates have varied, by less than the second threshold value D2 from before the contact to the screen to after that (S65: no), the process of the portable terminal 1B moves to step S66 with a judgment that a flick manipulation has not been made by the index finger 68a of the user. Step S66 and the following steps constitute a process to be executed by the portable terminal 1B when the index finger 68a of the user has made a touch manipulation.

The touch manipulation judging unit 88B judges whether or not a button is displayed at the touch position on the screen on the basis of the information of the touch coordinates (x, y) that is output from the touch coordinates extraction unit 52 (S66). More specifically, the hover manipulation judging unit 89B judges whether or not a button is displayed at the position of the touch coordinates (x, y) that are output from the touch coordinates extraction unit 52 on the basis of pieces of coordinate information, stored in the memory 40, of buttons to be displayed on the screen.

If judging that no button is displayed at the touch position on the screen, the touch manipulation judging unit 88B outputs, to the application 65 (S66: no), information to the effect that an operation corresponding to a touch manipulation made on a non-button display position on the screen. The application 65 performs the operation corresponding to a touch manipulation made on a non-button display position on the screen on the basis of the information that is output from the touch manipulation judging unit 88B (S67), and outputs an operation result to the application picture generation unit 59. The application picture generation unit 59 (display control unit) displays the operation result received from the application 65 on the screen of the display unit 13 (screen display unit 30).

If judging that a button is displayed at the touch position on the screen (S66: yes), then the touch manipulation judging unit 88B judges whether or not the touch manipulation made on the button satisfies existing touch judgment conditions (S68). An example of the existing touch judgment conditions is that the duration of contact to the screen is shorter than or equal to a prescribed value (e.g., 300 ms). Another example of the existing touch judgment conditions is that a position where the finger that has touched the screen has left it at a detectable position of the touch panel 15. If it is judged that the touch manipulation made on the button does not satisfy the existing touch judgment conditions (S68: no), the application performs an operation corresponding to the user manipulation on the basis of information that is output from the touch manipulation judging unit 88B (S69). An example case that the existing touch judgment conditions are not satisfied is a case that the user has made a long-push manipulation (of 1 sec or longer, for example) made at the position of the touch manipulation of the user. The application picture generation unit 59 (display control unit) displays an operation result received from the application 65 on the screen of the display unit 13 (screen display unit 30).

If judging that the touch manipulation made on the button satisfies the existing touch judgment conditions (S68: yes), the touch manipulation judging unit 88B outputs, to the application 65, information to the effect that an operation corresponding to the touch manipulation made on the button should be performed. The application 65 performs the operation corresponding to the touch manipulation made on the button on the basis of the information that is output from the touch manipulation judging unit 88B (S70) and outputs a result of the operation to the application picture generation unit 59. The application picture generation unit 59 (display control unit) displays the operation result received from the application 65 on the screen of the display unit 13 (screen display unit 30).

With the above process, when contact to the screen of the display unit 13 is detected, the portable terminal 1B according to the embodiment judges that the contact to the screen of the display unit 13 is of a flick manipulation if the x coordinate, the y coordinate, or both of them of the proximity coordinates (x, y, z) has or have varied by more than or equal to the second threshold value D2 from before the contact to after that. The portable terminal 1B judges that the contact to the screen of the display unit 13 is of a touch manipulation if the x coordinate, the y coordinate, or both of them of the proximity coordinates (x, y, z) has or have varied by less than the second threshold value D2 from before the contact to after that. Therefore, the portable terminal 1B can correctly discriminate between a touch manipulation and a flick manipulation as intentional manipulations of a user. And the portable terminal 1B does not erroneously detect a touch manipulation as a flick manipulation or vice versa. As a result, the probability of occurrence of erroneous detection of an input manipulation of a user can be lowered and a user can thereby enjoy enhanced ease of operation.

(Embodiment 4)

In a fourth embodiment, which has been conceived on the above-described background of the third and following embodiments, an example portable terminal will be described which correctly discriminates between an intentional touch manipulation and an unconscious contact action of a user and thereby lowers the probability of occurrence of erroneous detection by the touch panel.

The configuration of the portable terminal according to this embodiment is similar to that of the portable terminal 1B shown in FIG. 12. Therefore, in the description of the functional configuration of the portable terminal according to this embodiment, constituent elements having the same ones in the portable terminal 1B shown in FIG. 12 will be given the same reference symbols as the latter and descriptions therefor will be omitted. Only different constituent elements will be described below.

The touch manipulation judging unit 88B judges whether a user finger, palm, or hand has touch-manipulated the touch panel 15 on the basis of the information of touch coordinates (x, y) (contact detection signal) that is output from the touch coordinates extraction unit 52. If judging that a user finger, palm, or hand has touch-manipulated the touch panel 15, the touch manipulation judging unit 88B outputs, to the manipulation validity judging unit 84B, the information of the touch coordinates (x, y) and a judgment instruction to judge whether the touch manipulation is an intentional touch manipulation or an unconscious contact action of the user on the basis of the touch coordinates (x, y) and proximity coordinates (x, y, z) obtained with the touch manipulation.

If the judgment result of the manipulation validity judging unit 84B is an "unconscious contact action," the touch manipulation judging unit 88B invalidates and discards the touch coordinates (x, y) (contact detection signal) that are output from the touch coordinates extraction unit 52. That is, the touch manipulation judging unit 88B does not output, to the application 65, the information of the touch coordinates (x, y) that have been detected by the touch panel 15 as a contact detection signal of an unconscious contact action.

Figure 15:
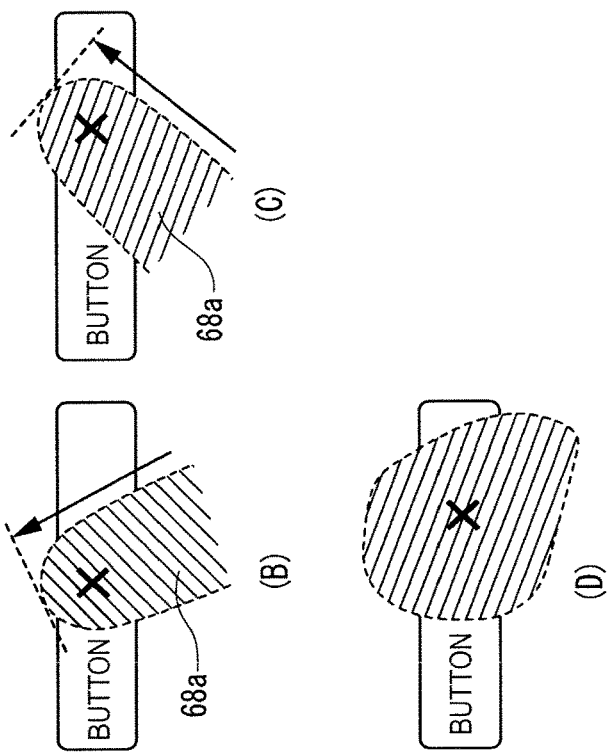
FIG. 15(A) illustrates erroneous detection due to an unconscious contact action.
FIGS. 15(B) and 15(C) illustrate example proximity detection signal detection ranges of an intentional touch manipulation on a button.
FIG. 15(D) illustrates an example proximity detection signal detection range of an unconscious contact action done on a button.
Figure 15:
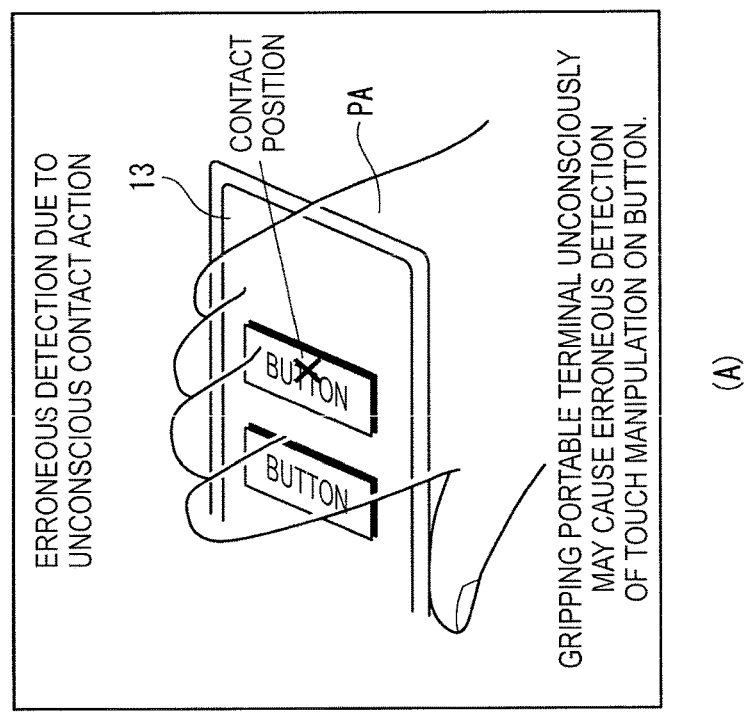
Figure 16:
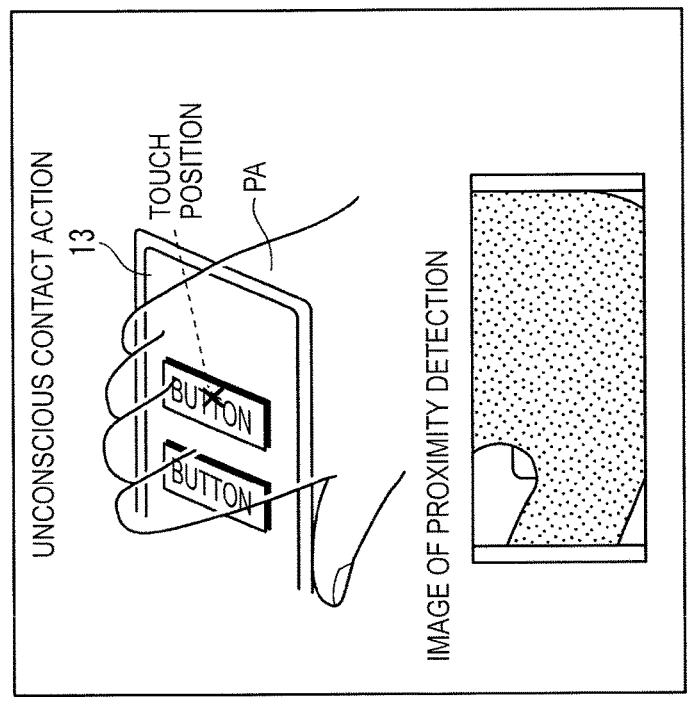
FIG. 16(A) illustrates an intentional touch manipulation and an image of a distribution of proximity detection signals detected with the intentional touch manipulation.
FIG. 16(B) illustrates an unconscious contact action and an image of a distribution of proximity detection signals detected due to the unconscious contact action.
Figure 16:
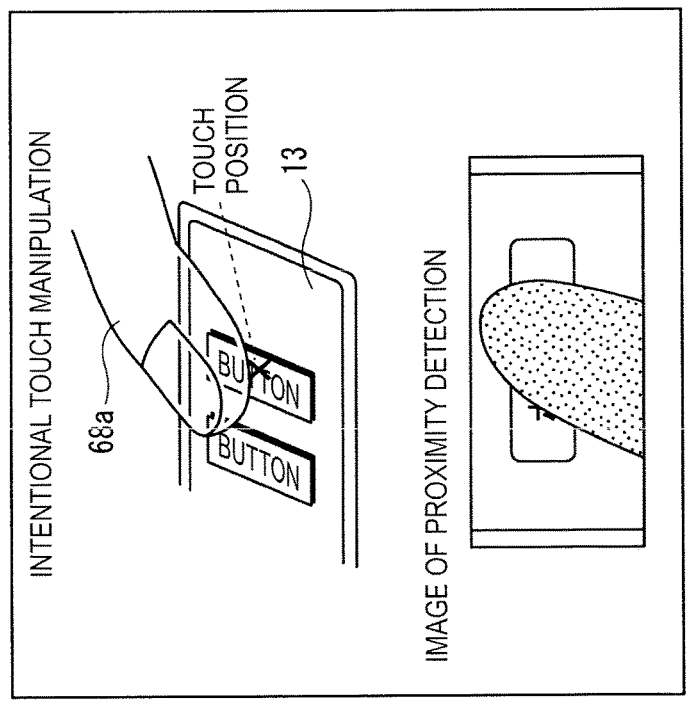

Next, a method by which the manipulation validity judging unit 84B discriminates between an intentional touch manipulation and an unconscious contact action of a user will be described with reference to FIGS. 15-18. FIG. 15(A) illustrates erroneous detection due to an unconscious contact action. FIGS. 15(B) and 15(C) illustrate example proximity detection signal detection ranges of an intentional touch manipulation on a button. FIG. 15(D) illustrates an example proximity detection signal detection range of an unconscious contact action done on a button. In FIGS. 15(A) and 15(D), mark "x" indicates a contact position of a portion of a hand PA that is touch-manipulating the button. In FIGS. 15(B) and 15(C), mark "x" indicates a touch position of an index finger 68a that is touch-manipulating the button.

When, for example, the user grips the body of the portable terminal 1B unconsciously (see FIG. 15(A)), there may occur an event that a portion of the hand PA comes into contact with a button (the right-hand button shown in the figure) displayed on the screen of the display unit 13. If a button is touched when the user grips the body of the portable terminal 1B unconsciously with his or her hand PA, the portable terminal 1B may erroneously detect the touch manipulation on the button as an intentional touch manipulation of the user.

In a case that a finger of the user touch-manipulates a button intentionally (see FIGS. 15(B) and 15(C)), a finger proximity detection signal detection range of a touch manipulation would be located only on one side of the button (including part of the button) and do not extend to a region on the other side of the button. The region on the other side of the button means is a region located on the opposite side of a boundary line indicated by a broken line in each of FIGS. 15(B) and 15(C) to the index finger 68a.

On the other hand, in a case that a portion of a hand PA comes into contact with a button when the user grips the body of the portable terminal (see FIG. 15(D)), a proximity detection signal detection range of the portion of the hand PA would occupy the whole or part of the button and a region neighboring the button.

Based on the above facts, the manipulation validity judging unit 84B discriminates between an intentional touch manipulation and an unconscious contact action of a user on the basis of whether the detection range of proximity detection signals (information of proximity coordinates (x, y, z)) detected when a portion of a finger PA or an index finger 68a of a user touch-manipulates the screen of the display unit 13 is located only on one side of the button (including part of the button) or occupies the whole or part of the button and a region neighboring the button.

FIG. 16(A) illustrates an intentional touch manipulation and an image of a distribution of proximity detection signals detected with an intentional touch manipulation. FIG. 16(B) illustrates an unconscious contact action and an image of a distribution of proximity detection signals detected due to an unconscious contact action. FIG. 17(A) illustrates a touch manipulation by an index finger 68a on a bottommost button BT4. FIG. 17(B) illustrates an example expanse of proximity detection signals detected with the touch manipulation shown in FIG. 17(A).

In the image shown in the bottom part of FIG. 16(A), the distribution (detection range) of proximity detection signals detected with an intentional touch manipulation extend only on the one side of the button and corresponds, in range, to the size of the index finger 68a. On the other hand, in the image shown in the bottom part of FIG. 16(B), the distribution (detection range) of proximity detection signals detected due to an unconscious contact action occupies the whole or part of the button and a region neighboring the button.

Figure 17:
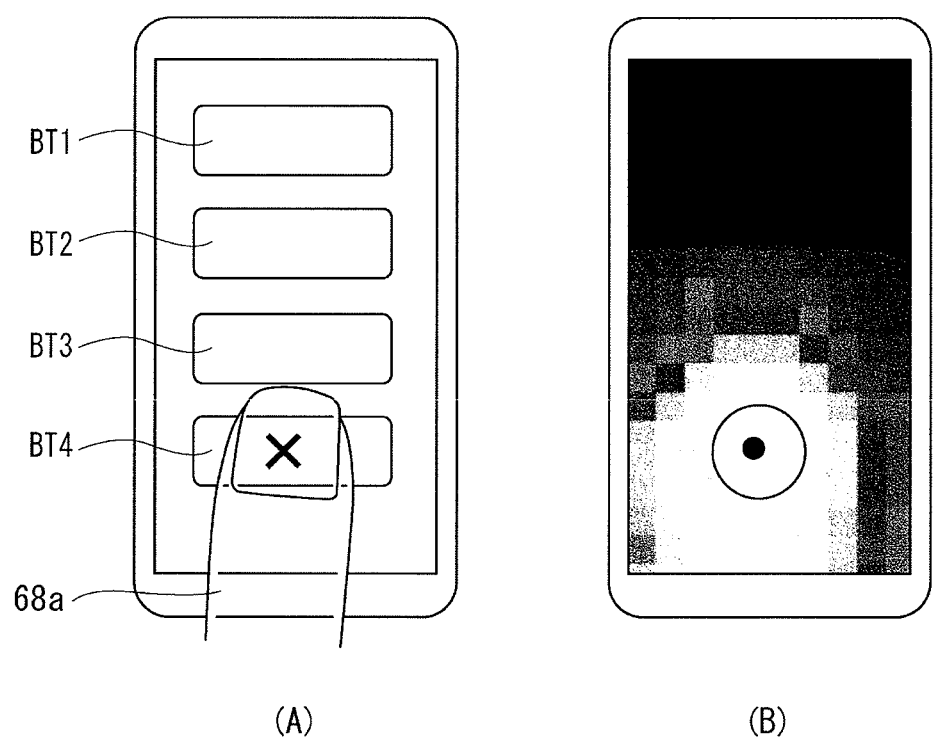
FIG. 17(A) illustrates a touch manipulation by an index finger 68a on a bottommost button BT4.
FIG. 17(B) illustrates an example expanse of proximity detection signals detected with the touch manipulation shown in FIG. 17(A).
Figure 18:
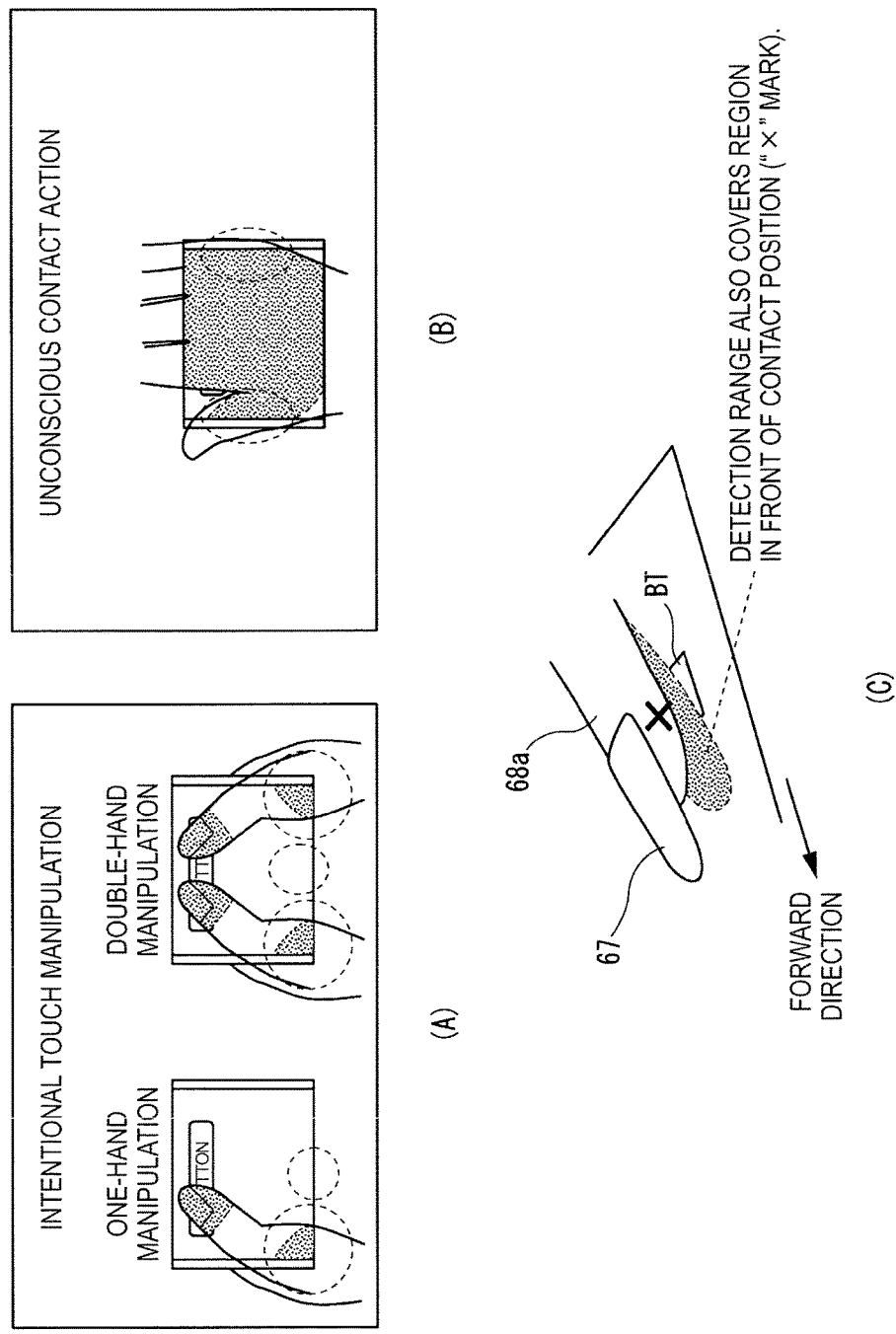
FIG. 18(A) shows an image of a distribution of proximity detection signals detected with an intentional touch manipulation made by one hand or both hands.
FIG. 18(B) shows an image of a distribution of proximity detection signals detected due to an unconscious contact action.
FIG. 18(C) shows a distribution, extending to a region in front of a button, of proximity detection signals that are detected when the button is touch-manipulated by an index finger to which a false nail is attached.

Now, a specific example of proximity detection signals detected with an intentional touch manipulation will be described with reference to FIG. 17. In the example of FIG. 17, to describe proximity detection signals in an easy-to-understand manner, values of capacitance between the index finger 68a and the touch panel 15 will be used. Assume that as shown in FIG. 17(A) an index finger 68a of the user intentionally touch-manipulates the bottommost button BT4 among four buttons BT1, BT2, BT3, and BT4.

When an index finger 68a of the user intentionally touch-manipulates the bottommost button BT4, as shown in FIG. 17(B) the distribution (detection range) of proximity detection signals (capacitance values) detected by the touch panel 15 for the index finger 68a extends like a thermography image so as to be largest at the position of the touch of the index finger 68a to the button B14 (indicated by mark "x" in FIG. 17(A)). In this manner, proximity detection signals corresponding to the shape of the index finger 68a are obtained in a region that is centered by the touch position.

Furthermore, the manipulation validity judging unit 84B can discriminate between an intentional touch manipulation and an unconscious contact action even in a case that the user is making a manipulation with one hand or both hands (see FIGS. 18(A) and 18(B)). FIG. 18(A) shows an image of a distribution of proximity detection signals detected with an intentional touch manipulation made by one hand or both hands. FIG. 18(B) shows an image of a distribution of proximity detection signals detected due to an unconscious contact action.

As shown in FIG. 18(A), in a case that the user is manipulating the portable terminal by gripping it with one hand (e.g., the left hand; the same applies to the case of the right hand), when the user touch-manipulates a button displayed on the screen of the display unit 13 with the thumb, for example, of the left hand, it is highly probable that its thenar and a neighboring portion comes close to or into contact with the touch panel 15.

In a case that the user is manipulating the portable terminal by gripping it with both hands, when the user touch-manipulates a button displayed on the screen of the display unit 13 with the thumbs, for example, of the left hand and the right hand, it is highly probable that their thenars and neighboring portions come close to or into contact with the touch panel 15.

Incidentally, as shown in FIG. 18(A), in either case of the one-hand manipulation and the double-hand manipulation, no hand comes close to a bottom-central portion of the screen of the display unit 13 and proximity detection signals would not detected or scarcely detected there.

On the other hand, as shown in FIG. 18(B), in the case where the user grips the portable terminal unconsciously with one hand so as to cover it, the distribution of proximity detection signals corresponding to part of the hand would occupy the whole or part of a button displayed on the screen and a region neighboring the button. In many cases, proximity detection signals would also be detected in left-central and right-central portions (indicated by broken lines) of the body of the portable terminal.

Therefore, the manipulation validity judging unit 84B may judge whether the user has made an intentional touch manipulation or done an unconscious contact action using the detection ranges of proximity detection signals shown in FIGS. 18(A) and 18(B).

In particular, where the user is a woman, the user may manipulate the portable terminal 1B wearing false nails 67 (see FIG. 18(C). As described above with reference to FIG. 15(D), if the detection range of proximity detection signals detected when a touch manipulation is made on a button occupies the whole or part of the button and a portion neighboring the button, the manipulation validity judging unit 84B judges that the contact is of an unconscious contact action rather than an intentional manipulation. Therefore, in the case of a user who manipulates the portable terminal 1B wearing false nails 67, the manipulation validity judging unit 84B may erroneously judges an intentional touch manipulation to be an unconscious contact action.

FIG. 18(C) shows a distribution, extending to a region in front of a button BT, of proximity detection signals that are detected when the button BT is touch-manipulated by an index finger 68a to which a false nail 67 is attached. In touch-manipulating the button BT wearing the false nail 67, because the user wears the false nail 67, she would touch the button using the cushion of her index finger 68a.

As described above, when the button BT is touch-manipulated by the index finger 68a to which the false nail 67 is attached, the detection range of resulting proximity detection signals are not only located on one side of the button BT (including part of the button BT) but also extends to a region located on the other side of the button BT (see FIG. 18(C)). Therefore, for a user who manipulates the portable terminal 1B wearing false nails 67, it is preferable to store, in advance, in the storage unit 23 (memory 40) of the portable terminal 1B, information indicating a tendency of proximity detection signals to be detected when the user makes a touch manipulation. This allows the manipulation validity judging unit MB to correctly discriminate between an intentional touch manipulation and an unconscious contact action using the information indicating the tendency of proximity detection signals to be detected with a touch manipulation which is stored in the storage unit 23 (memory 40). For example, the tendency information includes touch coordinates to be detected when the touch panel 15 is touch-manipulated by a finger and a detection range of proximity detection signals to be detected with the touch. It is preferable that the tendency information also include information of differences between the touch coordinates and the edge of the proximity detection signals to be detected with the touch.

(Operation of Portable Terminal 1B According to Embodiment 4)

Figure 19:
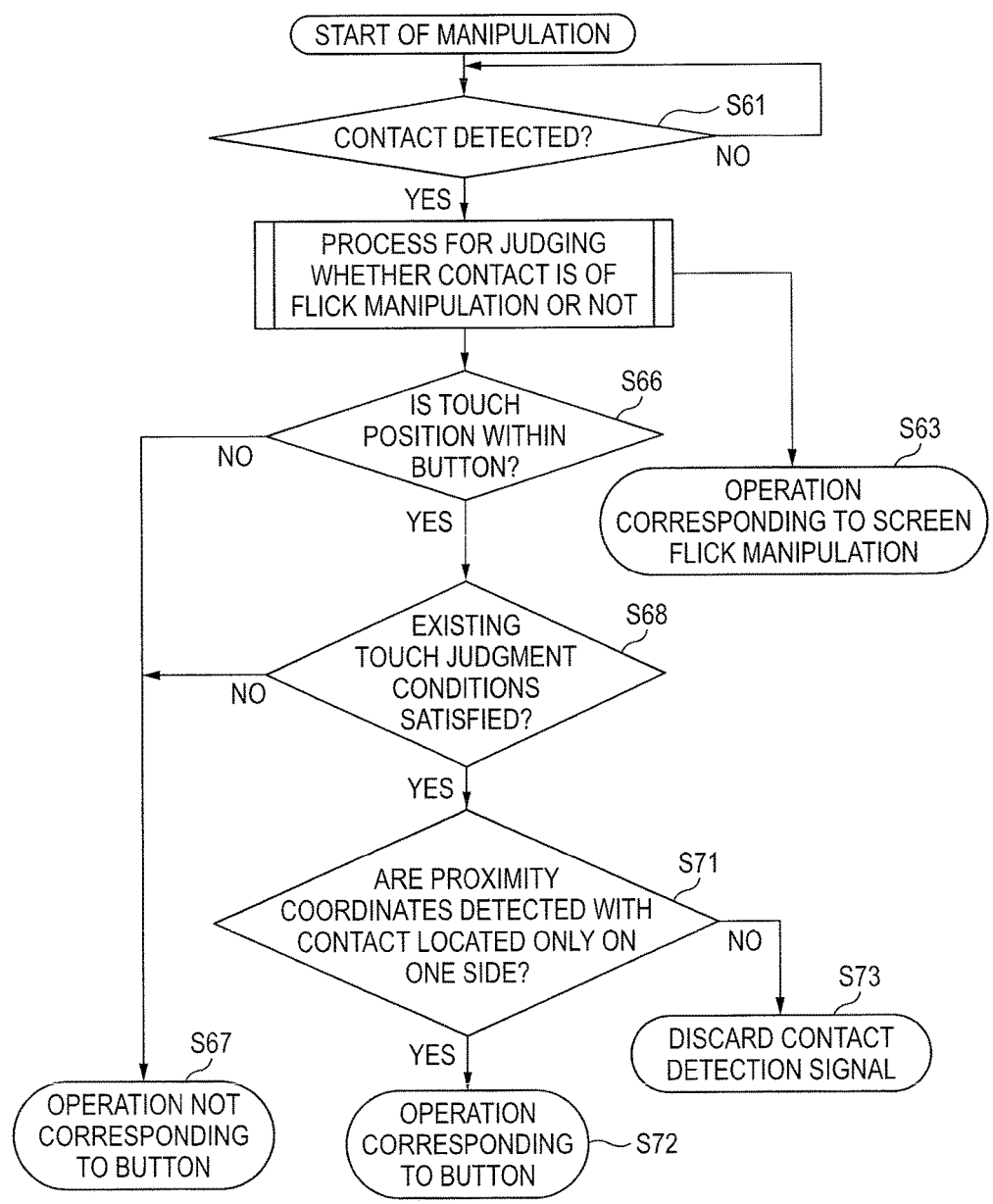
FIG. 19 is a flowchart of a procedure for discriminating between an intentional touch manipulation and an unconscious contact action made or done on a button in the portable terminal according to the fourth embodiment.

FIG. 19 is a flowchart of a procedure for discriminating between an intentional touch manipulation and an unconscious contact action made or done on a button in the portable terminal according to the fourth embodiment. In the flowchart of FIG. 19, step S61, the process for judging whether the contact is of a flick manipulation, and steps S63, S66, S67, and S68 are the same as those shown in FIG. 14 and hence descriptions therefor will be omitted. Only different steps than in the flowchart of FIG. 14 will be described below.

Referring to FIG. 19, if judging that the touch manipulation made on the button satisfies the existing touch judgment conditions (S68: yes), the touch manipulation judging unit 88B outputs, to the manipulation validity judging unit 84B, the information of the touch coordinates (x, y) and a judgment instruction to judge whether the contact detected by the touch panel 15 is an intentional touch manipulation or an unconscious contact action of the user on the basis of the touch coordinates (x, y) and proximity coordinates (x, y, z) of the finger, palm, or hand obtained at the time of the touch manipulation.

Based on the judgment instruction that is output from the touch manipulation judging unit 88B, the manipulation validity judging unit 84B judges whether or not the detection range of proximity detection signals (the information of the proximity coordinates (x, y, z)) detected when part of the hand PA or the index finger 68a of the user touch-manipulated the screen of the display unit 13 is located only on one side of the button (including part of the button) (S71).

If judging that the detection range of the proximity detection signals detected when part of the hand PA or the index finger 68a of the user touch-manipulated the screen of the display unit 13 is located only on one side of the button (S71: yes), the manipulation validity judging unit 84B outputs, to the touch manipulation judging unit 88B, a judgment result to the effect that an intentional touch manipulation of the user has been performed. Based on the information of the judgment result that is output from the manipulation validity judging unit 84B, the touch manipulation judging unit 88B outputs, to the application 65, information to the effect that an operation corresponding to the touch manipulation made on the button should be performed. The application 65 performs the operation corresponding to the touch manipulation made on the button on the basis of the information that is output from the touch manipulation judging unit 88B (S72), and outputs a result of the operation to the application picture generation unit 59. The application picture generation unit 59 (display control unit) displays the operation result received from the application 65 on the screen of the display unit 13 (screen display unit 30).

If judging that the detection range of the proximity detection signals detected when part of the hand PA or the index finger 68a of the user touch-manipulated the screen of the display unit 13 is not located only on one side of the button (S71: no), the manipulation validity judging unit 84B outputs, to the touch manipulation judging unit 88B, a judgment result to the effect that an unconscious contact action of the user has been performed. Based on the information of the judgment result that is output from the manipulation validity judging unit 84B, the touch manipulation judging unit 88B invalidates and discards the touch coordinates (x, y) (contact detection signal) that are output from the touch coordinates extraction unit 52 (S73).

With the above process, when a touch manipulation on the screen of the display unit 13 has been detected, the portable terminal 1B according to the embodiment correctly judges whether the touch manipulation on the screen of the display unit 13 is an intentional touch manipulation or an unconscious contact action of the user on the basis of a detection range indicating an expanse of proximity detection signals (the information of proximity coordinates (x, y, z)) detected with the touch manipulation of a hand PA or an index finger 68a. If judging that the touch manipulation on the screen of the display unit 13 is an intentional touch manipulation of the user, the portable terminal 1B performs an operation corresponding to the touch manipulation. If judging that the touch manipulation on the screen of the display unit 13 is an unconscious contact action of the user, the portable terminal 1B invalidates and discards a contact detection signal (the information of touch coordinates (x, y)). As a result, the portable terminal 1B can correctly discriminate between an intentional touch manipulation and an unconscious contact action and thereby lower the probability of occurrence of erroneous detection of an input manipulation of a user on the touch panel 15.

(Embodiment 5)

A fifth embodiment is directed to an example portable terminal that is different from the portable terminals according to the above embodiments in having plural (e.g., two) display units (screen display units) whose screens are provided with different touch panels. In the following description, the portable terminal according to this embodiment will be referred to as a double-screen portable terminal 1C (see FIG. 21(A)).

As shown in FIG. 21(A), the double-screen portable terminal 10 is configured in such a manner that a front body 1CF and a back body 1CB are connected by a hinge (not shown) so as to be rotatable with respect to each other. The front body 1CF is provided with a screen display unit 30F which incorporates a front touch panel 15F, and the back body 1CB is provided with a screen display unit 30B which incorporates a back touch panel 15B. FIG. 21(A) illustrates how to fold the double-screen portable terminal 10 according to the fifth embodiment into a state that the screen display units 30F and 30B come to be opposed to each other. The right-hand part of FIG. 21(A) shows an opposed state that the screen display units 30F and 30B are opposed to each other. The opposed state means a state that the front body 1CF and the back body 1CB face each other and, as a result, the screen display units 30F and 30B are opposed to each other. However, the opposed state is not restricted to a state that the front body 1CF and the back body 1CB are in contact with each other, and may include, for example, a state that the angle formed by the front body 1CF and the back body 1CB is smaller than or equal to a prescribed angle.

Now assume, as an example of major manipulations performed in the double-screen portable terminal 1C, a touch manipulation that is performed by the user on a button BT displayed on the screen of the screen display unit 30F after folding the front body 1CF and the back body 1CB of the double-screen portable terminal 1C. In this case, since the user grips the double-screen portable terminal 1C so as to cover the front body 1CF or the back body 1 CB, the back touch panel 15B would detect that the hand PA of the user is close to or in contact with part of the screen display unit 30B. For example, the double-screen portable terminal 1C invalidates detection of such a proximity or contact state.

Figure 20:
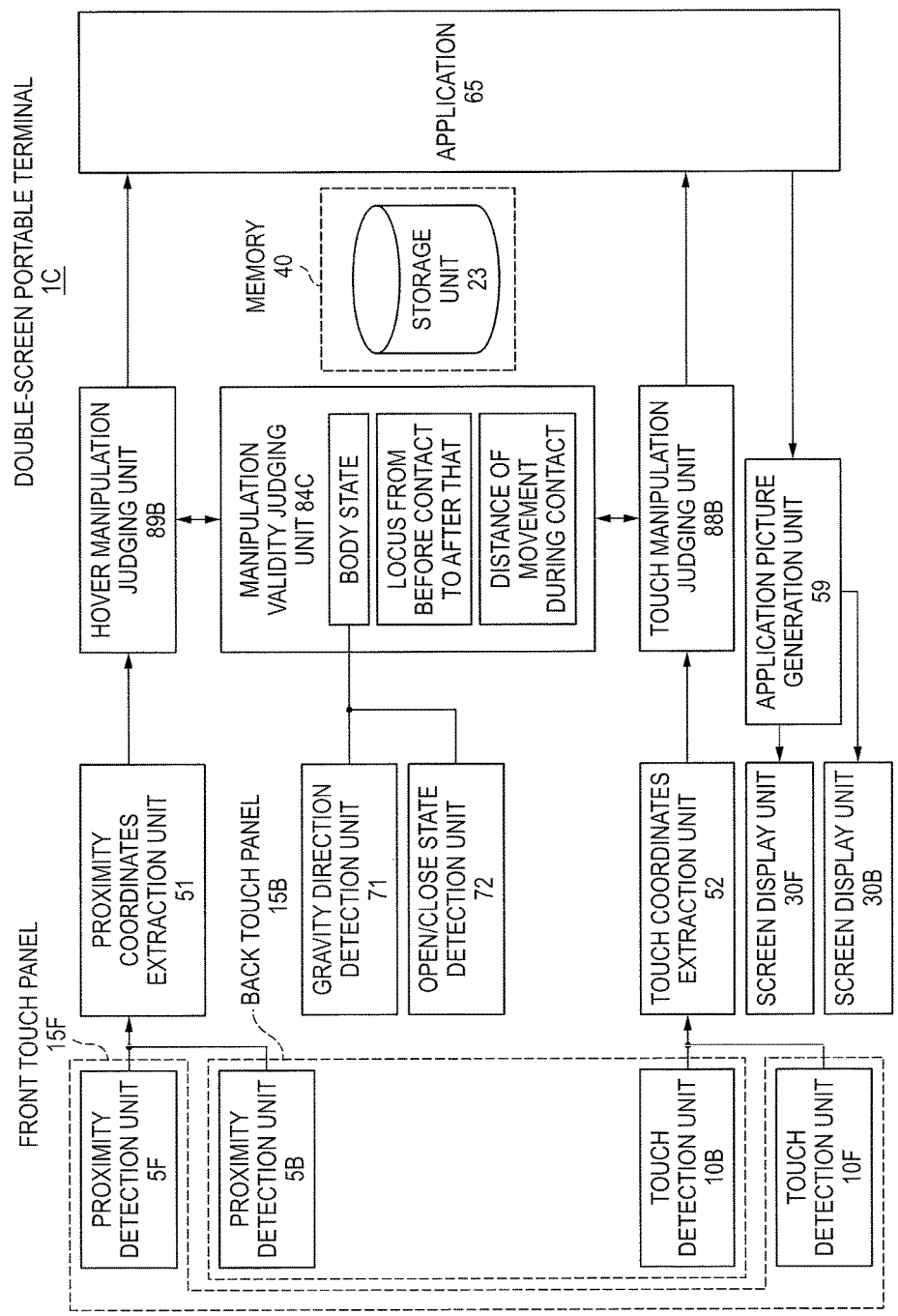
FIG. 20 is a block diagram showing the functional configuration of a double-screen portable terminal according to a fifth embodiment.

FIG. 20 is a block diagram showing the functional configuration of the double-screen portable terminal 1C according to the fifth embodiment. The portable terminal 1C shown in FIG. 20 includes a proximity detection unit 5F, a proximity detection unit 5B, a touch detection unit 10F, a touch detection unit 10B, a screen display unit 30F, a screen display unit 30B, a proximity coordinates extraction unit 51, a touch coordinates extraction unit 52, a gravity direction detection unit 71, an open/closed state detection unit 72, a hover manipulation judging unit 89B, a touch manipulation judging unit 88B, a manipulation validity judging unit 84C, an application 65, and an application picture generation unit 59. The double-screen portable terminal 1C may also include a memory 40 (storage unit 23). Constituent elements having the same ones in the portable terminal 1B shown in FIG. 12 will be given the same reference symbols as the latter and descriptions therefor will be omitted. Only different constituent elements will be described below.

The proximity detection unit 5F detects that a finger, palm, or hand of the user has come close to the screen display unit 30F shown in FIG. 21(A) as a result of a hover manipulation or a hover slide manipulation. The proximity detection unit 5B detects that a finger, palm, or hand of the user has come close to the screen display unit 30B shown in FIG. 21(A) as a result of a hover manipulation or a hover slide manipulation.

The touch detection unit 10F detects that a finger, palm, or hand of the user has touched the front touch panel 15F (screen display unit 30F) shown in FIG. 21(A) as a touch manipulation or a touch slide manipulation. The touch detection unit 10B detects that a finger, palm, or hand of the user has touched the back touch panel 15B (screen display unit 30F) shown in FIG. 21(A) as a touch manipulation or a touch slide manipulation. The proximity detection unit 5F and the touch detection unit 10F constitute the front touch panel 15F, and the proximity detection unit 5B and the touch detection unit 10B constitute the front touch panel 15B.

The screen display unit 30F, which is provided in the front body 1CF of the double-screen portable terminal 1C and has a function of displaying data on the screen of the screen display unit 30F, displays, for example, screen-picture data that is output from the application picture generation unit 59. Likewise, the screen display unit 30B, which is provided in the back body 1CB of the double-screen portable terminal 10 and has a function of displaying data on the screen of the screen display unit 30B, displays, for example, screen-picture data that is output from the application picture generation unit 59.

The proximity coordinates extraction unit 51 calculates and extracts proximity coordinates (x, y, z) of a finger, palm, or hand on or with respect to the front touch panel 15F or the back touch panel 15B on the basis of a proximity notice that is output from the proximity detection unit 5F or 5B. The proximity coordinates extraction unit 51 outputs the information of the extracted proximity coordinates (x, y, z) to the hover manipulation judging unit 89B.

The touch coordinates extraction unit 52 calculates and extracts touch coordinates (x, y) where a finger, palm, or hand has touched the front touch panel 15F or the back touch panel 15B on the basis of a contact notice that is output from the touch detection unit 10F or 10B. The touch coordinates extraction unit 52 outputs the extracted touch coordinates (x, y) to the touch manipulation judging unit 88B.

The gravity direction detection unit 71, which is formed using, for example, an acceleration sensor and a gyro sensor, detects the direction of influence of gravity acceleration (i.e., gravity direction) and also detects how the double-screen portable terminal 10 is inclined, that is, which of the screen display units 30F and 30B is located above (or below) in the gravity direction. The gravity direction detection unit 71 outputs the information of detection results to the manipulation validity judging unit 84C.

The open/closed state detection unit 72, which is formed by using, for example, a magnetic sensor, detects an open/closed state of the front body 1CF and the back body 1CB. The open/closed state of the front body 1CF and the back body 1CB means whether or not the front body 1CF and the back body 1CB are opposed to each other. The open/closed state detection unit 72 outputs the information of a detection result to the manipulation validity judging unit 84C.

Figure 21:
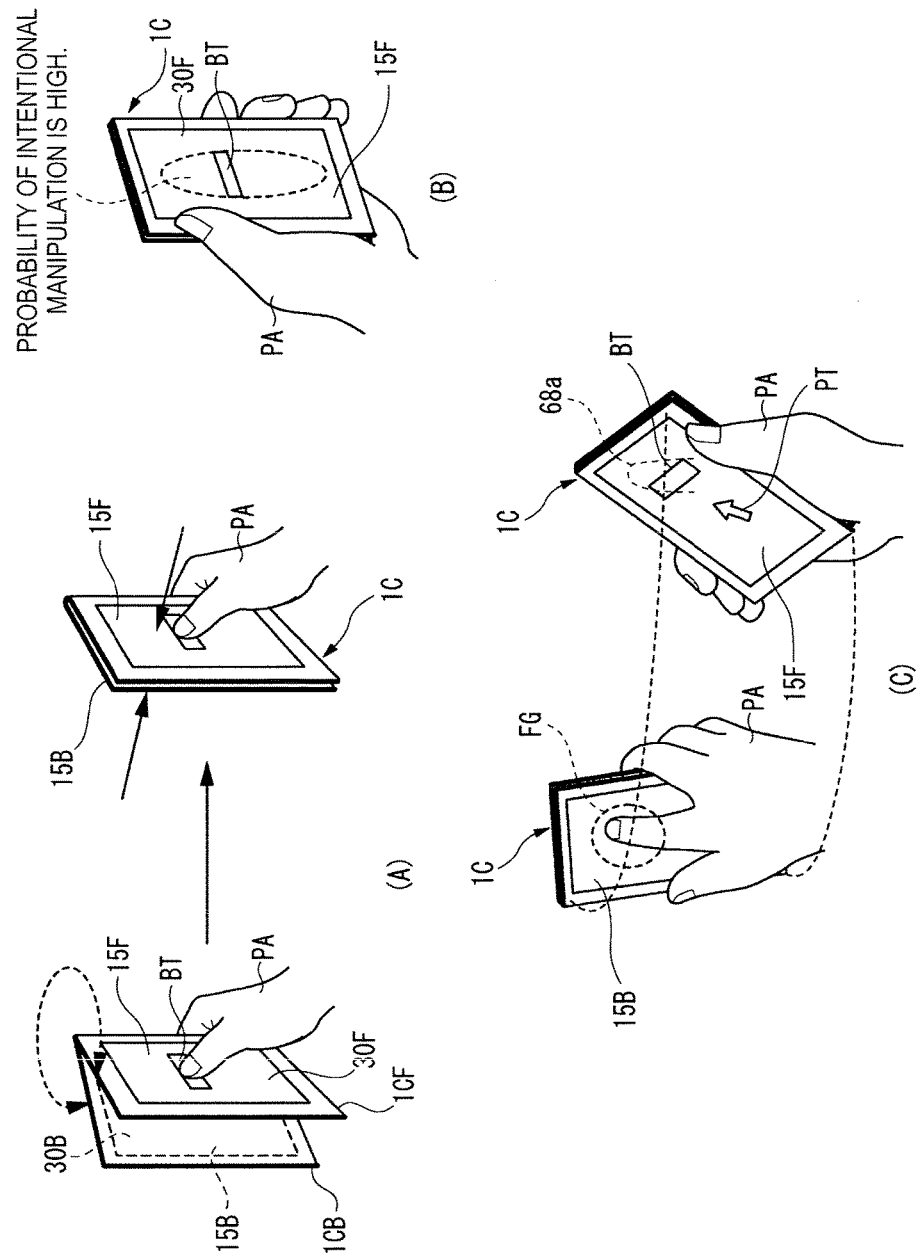
FIG. 21(A) illustrates how to fold the double-screen portable terminal according to the fifth embodiment into a state that two screen display units come to be opposed to each other.
FIG. 21(B) illustrates a case that a touch manipulation on a front touch panel is judged as valid.
FIG. 21(C) illustrates a case that an indirect touch manipulation on a screen display unit 30B in an index finger movable area FG provided thereon is judged as valid.

Now, with reference to FIG. 21, a description will be made of an example operation that the manipulation validity judging unit 84C performs when the user intentionally touch-manipulates a button displayed on the screen of the screen display unit 30F which incorporates the front touch panel 15F while gripping the double-screen portable terminal 10. FIG. 21(B) illustrates a case that a touch manipulation on the front touch panel 15F is judged as valid.

First, the user folds the front body 1CF and the back body 1CB to make them opposed to each other (see FIG. 21(A) or 21(B)). After the front body 1CF and the back body 1CB have faced each other, as shown in FIG. 21(B) the user grips, with a hand PA (in FIG. 21(B), left hand), approximately central portions of the side surfaces of the front body 1CF and the back body 1 CB. Then the user touch-manipulates a button BY displayed on the screen of the screen display unit 30F with a finger of the hand not shown (right hand).

In this case, the back touch panel 15B detects coming into proximity or contact of the hand PA (left hand) of the user to the screen display unit 30B before the front touch panel 15F detects an intentional touch manipulation made by a finger of the hand not shown (right hand) of the user on the button BT displayed on the screen of the screen display unit 30F. At the same time, the front touch panel 15F detects coming into proximity or contact, to the screen display unit 30F, of fingers of the hand PA (left hand) that go around from the back body 1CB to the front body 1CF. Since each of the back touch panel 15B and the front touch panel 15F detects the above-described coming into proximity or contact, the double-screen portable terminal 10 may perform an unexpected operation before an operation corresponding to the button BT the user wants to touch-manipulate intentionally. This means erroneous detection of the double-screen portable terminal 10.

In view of the above, the manipulation validity judging unit 84C judges that proximity coordinates (proximity detection signals) or touch coordinates (contact detection signal) that are detected by the back touch panel 15B as a result of coming into proximity or contact of the hand PA (left hand) to the screen display unit 30B are invalid on the basis of detection results of the gravity direction detection unit 71 and the open/closed state detection unit 72, the information of proximity coordinates (x, y, z) that is output from the hover manipulation judging unit 89B, and the information of touch coordinates (x, y) that is output from the touch manipulation judging unit 88B. Furthermore, the manipulation validity judging unit 84C judges that proximity coordinates (proximity detection signals) or touch coordinates (contact detection signal) that are detected by the front touch panel 15F as a result of coming into proximity or contact of the hand PA (left hand) to the screen display unit 30F are invalid.

For another example, as a finger of the hand not shown (right hand) of the user touch-manipulates the button BT displayed on the screen of the screen display unit 30F while the hand PA (left hand) of the user grips approximately central portions of the side surfaces of the front body 1 CF and the back body 1 CB so as to cover the front body 1 CF or the back body 1CB, there may occur an event that the back touch panel 15B detects contact to the screen display unit 30B being opposed to the screen display unit 30F. In this case, if a button is displayed on the screen display unit 30B, the double-screen portable terminal 10 may perform an operation that is not expected by the user as the button displayed on the screen of the screen display unit 30F is touch-manipulated. This means erroneous detection of the double-screen portable terminal 1C.

In view of the above, the manipulation validity judging unit 84C judges that touch coordinates (contact detection signal) that are detected by the back touch panel 15B as a result of contact to the screen display unit 30B are invalid on the basis of detection results of the gravity direction detection unit 71 and the open/closed state detection unit 72, the information of proximity coordinates (x, y, z) that is output from the hover manipulation judging unit 89B, and the information of touch coordinates (x, y) that is output from the touch manipulation judging unit 88B.

For still another example, assume that a finger of the hand not shown (right hand) of the user touch-manipulates a button displayed on the screen of the screen display unit 30F while the proximity detection signal or the contact detection signal is in a steady state that is detected by the back touch panel 15B as a result of coming into proximity or contact of the hand PA (left hand) that grips approximately central portions of the side surfaces of the front body 1CF or the back body 1CB so as to cover the front body 1CF or the back body 1CB that are opposed to each other. The proximity detection signal or the contact detection signal being in a steady state means a state that the hand PA (left hand) of the user is gripping, stably and continuously, approximately central portions of the side surfaces of the front body 1CF and the back body 1CB so as to cover the front body 1CF or the back body 1CB that are opposed to each other.

In this case, the manipulation validity judging unit 84C judges that touch coordinates obtained as a result of the touch manipulation of the hand not shown (right hand) of the user on the button BT is valid on the basis of detection results of the gravity direction detection unit 71 and the open/closed state detection unit 72, the information of proximity coordinates (x, y, z) that is output from the hover manipulation judging unit 89B, and the information of touch coordinates (x, y) that is output from the touch manipulation judging unit 88B.

As disclosed in the following Referential Patent document 1, it is known that a pointer displayed on a front-side screen of a body of a portable terminal is moved in accordance with an indirect touch manipulation on a touch pad that occupies a prescribed back-side area of the body of the portable terminal. FIG. 21(C) illustrates a case that an indirect touch manipulation on the screen display unit 30B in an index finger movable area FG provided thereon is judged as valid.

(Referential Patent document 3) WO-A-2009/031213

As shown in FIG. 21(C), assume that the hand PA (right hand) of the user grips approximately central portions of the side surfaces of the screen display units 30F and 30B that are opposed to each other so as to cover the screen display unit 30F or 30B and the index finger of the hand PA performs a touch manipulation or a touch slide manipulation as an indirect touch manipulation on the screen display unit 30B in the prescribed area (index finger movable area FG) to move a pointer PT displayed on the screen display unit 30F toward a button BT. For example, when the button BT is displayed on the screen display unit 30F, the manipulation validity judging unit 84C judges that a contact detection signal that is detected by the front touch panel 15F in response to an intentional touch manipulation on the button BT made by the hand not shown (left hand) of the user is valid. However, if the manipulation validity judging unit 84C judges that a contact detection signal that is detected by the back touch panel 15B in response to an indirect touch manipulation of the hand PA (right hand) as described above with reference to FIGS. 21(A) and 21(B) is invalid, the double-screen portable terminal 1C cannot perform a movement control of a pointer PT in response to an indirect touch manipulation as described in the above-described in Reference Patent document 3. This would result in reduction in operability.

In view of the above, the manipulation validity judging unit 84C judges that touch coordinates (contact detection signal) that are detected with a touch manipulation or a touch slide manipulation as an indirect touch manipulation made by the index finger of the hand PA (right hand) on the screen display unit 30B in the prescribed area (index finger movable area FG) (see FIG. 21(C)) is valid on the basis of detection results of the gravity direction detection unit 71 and the open/closed state detection unit 72, the information of proximity coordinates (x, y, z) that is output from the hover manipulation judging unit 89B, and the information of touch coordinates (x, y) that is output from the touch manipulation judging unit 88B.

(Operation of Double-Screen Portable Terminal 10 According to Embodiment 5)

Figure 22:
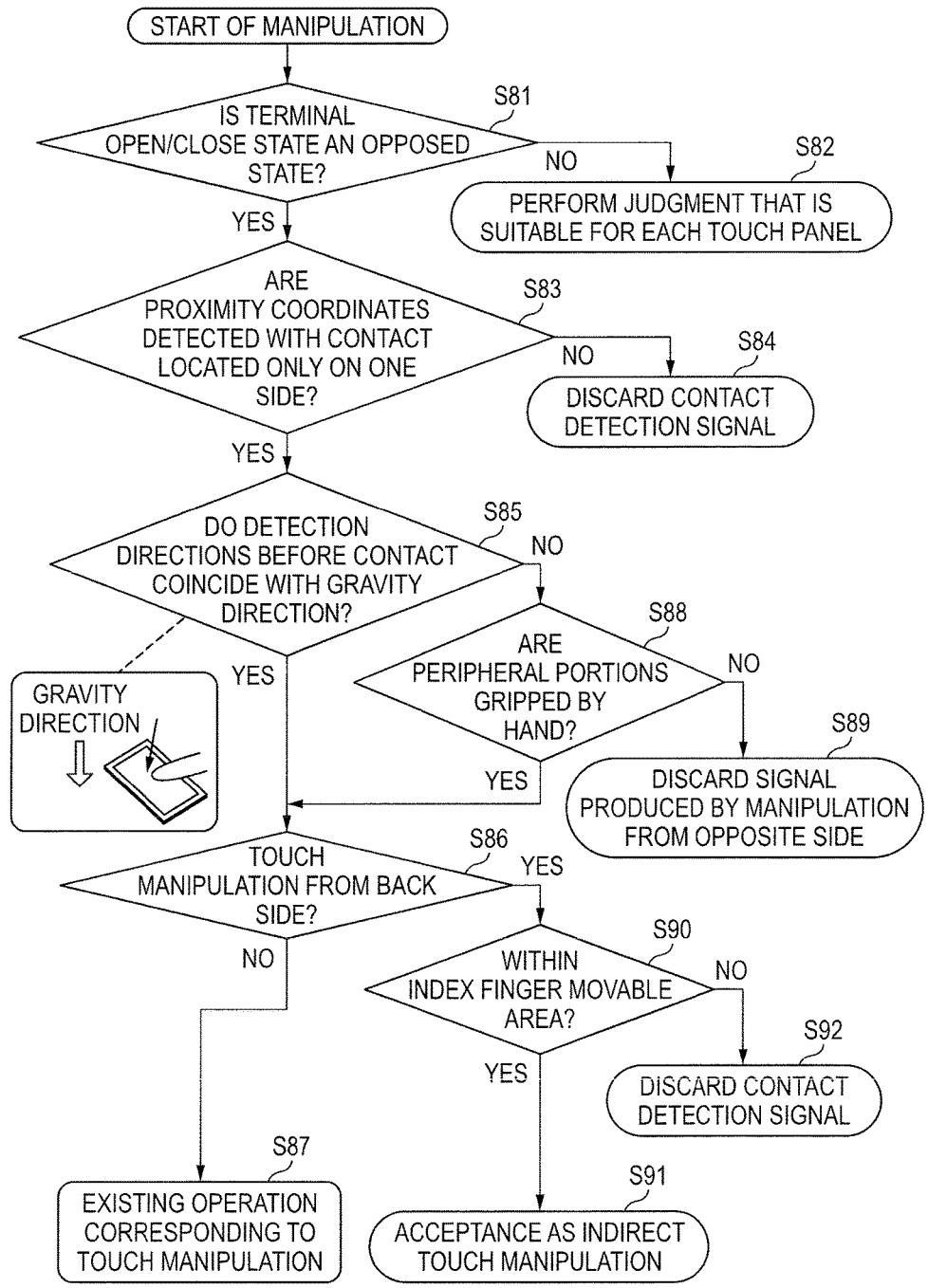
FIG. 22 is a flowchart of an operation procedure of the double-screen portable terminal according to the fifth embodiment.

FIG. 22 is a flowchart of an operation procedure of the double-screen portable terminal according to the fifth embodiment. The flowchart of FIG. 22 assumes that the front touch panel 15F has detected contact of a finger PA of the user to a button BT that is displayed on the screen of the screen display unit 30F.

Referring to FIG. 22, the manipulation validity judging unit 84C judges a terminal open/close state of the double-screen portable terminal 10, that is, whether or not the front body 1CF and the back body 1CB are opposed to each other, on the basis of the information of a detection result that is output from the open/closed state detection unit 72 (S81). If judging that the terminal open/close state of the double-screen portable terminal 10 is not an opposed state (S81: no), the manipulation validity judging unit 84C performs the user input manipulation judging method that has been described in the third or fourth embodiment in accordance with the front touch panel 15F or the back touch panel 15B (S82). For example, the manipulation validity judging unit 84C judges whether an input manipulation made on the front touch panel 15F is a touch manipulation or a flick manipulation. Or the manipulation validity judging unit 84C judges an input manipulation made on the back touch panel 15B is an intentional touch manipulation or an unconscious contact action of the user.

Based on a judgment instruction that is output from the touch manipulation judging unit 88B, the manipulation validity judging unit 84C judges whether or not the detection range of detection signals (information of proximity coordinates (x, y, z)) detected by the front touch panel 15F as a result of contact of part of the hand PA or the index finger 68a of the user to the screen of the screen display unit 30F is located only on one side of the button BT (including part of the button BT) displayed on the same screen (S83).

If judging that the detection range of the detection signals (information of proximity coordinates (x, y, z)) detected with the contact is not located only on one side of the button BT (S83: no), the manipulation validity judging unit 84C outputs, to the touch manipulation judging unit 88B, a judgment result to the effect that an unconscious contact action of the user has been done. The touch manipulation judging unit 88B invalidates and discards touch coordinates (x, y) (contact detection signal) that are output from the touch coordinates extraction unit 52 (S84).

If judging that the detection range of the detection signals (information of proximity coordinates (x, y, z)) detected with the contact is located only on one side of the button BT (S83: yes), then the manipulation validity judging unit 84C judges, on the basis of the information of a judgment result that is output from the gravity direction detection unit 71, whether or not the detection directions of proximity detection signals and a contact detection signal obtained before the contact which was detected before step S81 coincide with the gravity direction (S85).

If judging that the detection directions of the proximity detection signals and the contact detection signal obtained before the contact coincide with the gravity direction (S85: yes), then the manipulation validity judging unit 84C judges whether or not the screen display unit 30B of the back body 1CB has received a touch manipulation (S86).

If judging that the screen display unit 30B has not received a touch manipulation (S86: no), the manipulation validity judging unit 84C outputs, to the touch manipulation judging unit 88B, a judgment result to the effect that an intentional touch manipulation of the user has been performed on the screen display unit 30F. Based on the judgment result that is output from the manipulation validity judging unit 84C, the touch manipulation judging unit 88B outputs, to the application 65, information to the effect that an operation corresponding to the touch manipulation made on the button BT should be performed. The application 65 performs the operation corresponding to the touch manipulation made on the button BT on the basis of the information that is output from the touch manipulation judging unit 88B (S87), and outputs a result of the operation to the application picture generation unit 59. The application picture generation unit 59 (display control unit) displays the operation result received from the application 65 on the screen of the display unit 13 (screen display unit 30).

If judging that the detection directions of the proximity detection signals obtained before the contact and the contact detection signal do not coincide with the gravity direction, that is, in the opposite direction to the gravity direction (S85: no), then the manipulation validity judging unit 84C judges whether or not the hand PA of the user is gripping peripheral portions of the respective bodies (e.g., approximately central portions of the respective body side surfaces) so as to cover one of the front body 1 CF and the back body 1 CB which are opposed to each other (S88). More specifically, the manipulation validity judging unit 84C judges whether or not the front touch panel 15F or the back touch panel 15B has detected proximity detection signals or a contact detection to be produced when the corresponding body is gripped by the hand PA.

If judging that the hand PA of the user is not gripping, for example, approximately central portions of the respective body side surfaces (S88: no), the manipulation validity judging unit 84C outputs, to the touch manipulation judging unit 88B, a judgment result to the effect that the hand PA of the user is not gripping approximately central portions of the respective body side surfaces. Based on the judgment result that is output from the manipulation validity judging unit 84C, the touch manipulation judging unit 88B invalidates and discards a contact detection signal (information of touch coordinates (x, y)) that was detected before step S81 in response to contact to the screen display unit 30B (S89) with an understanding that usually the hand PA of the user cannot make a manipulation on the screen display unit 30B without gripping the double-screen portable terminal 1C.

On the other hand, if judging that the hand PA of the user is gripping, for example, approximately central portions of the respective body side surfaces (S88: yes), then the manipulation validity judging unit 84C judges that a proximity manipulation (e.g., hover manipulation) or a contact manipulation (touch manipulation) corresponding to proximity detection signals or a contact detection signal detected by each of the front touch panel 15F and the back touch panel 15B because of the gripping by the hand PA is invalid (see FIGS. 21(A) and 21(B)). Then the process of the double-screen portable terminal 1C moves to step S86.

If judging that the touch coordinates extraction unit 52 has received information of touch coordinates (x, y) produced as a result of a touch manipulation on the screen display unit 30B (86: yes), then the manipulation validity judging unit 84C judges whether or not the position of the touch manipulation made on the screen display unit 30B is within the index finger movable area FG (see FIG. 21(C)) (S90).

If judging that the position of the touch manipulation made on the screen display unit 30B is within the index finger movable area FG (see FIG. 21(C)) (S90: yes), the manipulation validity judging unit 84C accepts the touch manipulation on the screen display unit 30B as an indirect touch manipulation (refer to Referential Patent document 3) (S91) and outputs, to the touch manipulation judging unit 88B, information to the effect that a touch manipulation on the screen display unit 30B has been accepted as an indirect touch manipulation. Based on the information that is output from the manipulation validity judging unit 84C, the touch manipulation judging unit 88B outputs, to the application 65, information to the effect that an operation corresponding to the indirect touch manipulation should be performed. Based on the information that is output from the touch manipulation judging unit 88B, the application 65 performs the operation corresponding to the indirect touch manipulation, for example, moves a pointer PT displayed on the screen display unit 30F. The application picture generation unit 59 (display control unit) displays an operation result of the application 65 on the screen display unit 30F.

If judging that the position of the touch manipulation made on the screen display unit 30B is not within the index finger movable area FG (see FIG. 21(C)) (S90: no), the manipulation validity judging unit 84C outputs, to the touch manipulation judging unit 88B, a judgment result to the effect that the position of the touch manipulation made on the screen display unit 30B is not within the index finger movable area FG. Based on the judgment result that is output from the manipulation validity judging unit 84C, the touch manipulation judging unit 88B invalidates and discards the contact detection signal (information of touch coordinates (x, y)) that was detected at step S86 in response to the contact to the screen display unit 30B (S92) with an understanding that usually the user cannot make touch manipulations intentionally on both of the screen display units 30F and 30B.

With the above process, when one hand of the user grips approximately central portions of the respective body side surfaces so as to cover one of the screen display units 30F and 30B which are opposed to each other and a finger of the other hand of the user makes an intentional touch manipulation on a button BT displayed on, for example, the screen display unit 30F, the double-screen portable terminal 10 according to this embodiment invalidates and discards proximity detection signals or a contact detection signal that was detected before the above touch manipulation as a result of coming into proximity or contact of the one hand. The double-screen portable terminal 10 judges that a contact detection signal is valid that is detected in response to the intentional touch manipulation by the finger of the other hand PA of the user on the button BT displayed on, for example, the screen display unit 30F while the one hand of the user grips approximately central portions of the respective body side surfaces so as to cover one of the screen display units 30F and 30B which are opposed to each other. Furthermore, the double-screen portable terminal 1C judges that a contact detection signal that is detected by the back touch panel 15B as a result of contact of the same finger to the screen display unit 30B as the front touch panel 15F is pushed by the intentional touch manipulation is invalid.

With the above measures, where the screen display unit 30F and 30B are not opposed to each other, the double-screen portable terminal 10 can use the judging method described in the third or fourth embodiment for judgment of an input manipulation made on the screen display unit 30F or 30B. Furthermore, where the screen display unit 30F and 30B are opposed to each other, the double-screen portable terminal 10 can judge that proximity detection signals or a contact detection signal is invalid that was detected, before an intentional touch manipulation of the user on, for example, the screen display unit 30F, as a result of coming into proximity or contact of a hand of the user that is gripping one of the front body 1CF and the back body 1CB that are opposed to each other so as to cover it. Where the screen display unit 30F and 30B are opposed to each other, since the double-screen portable terminal 1C discards proximity detection signals or a contact detection signal that was detected before an intentional touch manipulation of the user on, for example, the screen display unit 30F, an event is prevented that an operation that is not expected by the user is performed before the user makes an intentional touch manipulation. The probability of occurrence of erroneous detection can thus be lowered.

Although the various embodiments have been described above with reference to the drawings, it goes without saying that the invention is not limited to those examples. It is apparent that those skilled in the art would conceive changes or modifications of the various embodiments or combinations of the various embodiments within the confines of the scope of the claims. And such changes, modifications, or combinations should naturally be included in the technical scope of the invention.

In the fifth embodiment, the gravity direction detection unit 71 (e.g., gyro sensor) detects an inclination direction of the double-screen portable terminal 10. However, the means for detecting an inclination direction of the double-screen portable terminal 1C is not limited to the gravity direction detection unit 71. For example, an inclination direction of the double-screen portable terminal 10 may be detected in the following manner. Each of the front body 1CF and the back body 1CB is provided with a luminance sensor capable of measuring ambient luminance of the double-screen portable terminal 1C. When the front body 1CF and the back body 1CB are opposed to each other, one of the front body 1CF and the back body 1 CB is judged to be directed to the user if it is provided with a luminance sensor that produces a larger luminance value between the two luminance sensors.

The present application is based on Japanese Patent Application No. 2012-104125 filed on Apr. 27, 2012 and Japanese Patent Application No. 2012-141277 filed on Jun. 22, 2012, the disclosures of which are incorporated herein by reference.

INDUSTRIAL APPLICABILITY

The invention is useful when applied to input device, input support methods, and programs which make it possible to lower the probability of acceptance of an erroneous manipulation of a user by correctly discriminating between valid signals and return signals of successive movement manipulations that are input by the user through a touch panel and invalidating the return signals.

DESCRIPTION OF SYMBOLS 1, 1A, 1B: Portable terminal
1C: Double-screen portable terminal
5, 5F, 5B: Proximity detection unit
30, 30F, 30B: Screen display unit
40: Memory
51: Proximity coordinates detection unit
52: Touch coordinates detection unit
56: Manipulation judging unit
59: Application picture generation unit
65. Application
84, 84A, 84B, 84C: Manipulation validity judging unit
88, 88B: Touch manipulation judging unit
89, 89B: Hover manipulation judging unit

The invention claimed is:

1. An input device, comprising:
a display that displays contents on a screen;
a detector that detects an indicator and a hover slide performed by the detected indicator, the hover slide being a movement of the indicator substantially parallel to the screen without contacting the screen;
a judging processor that judges whether the detected hover slide indicates a valid contactless manipulation from a starting position or a return contactless manipulation which is performed after the valid contactless manipulation to return the indicator to a substantially same position as the starting position, and
a controller that controls the display so that,
when the valid manipulation is judged to be indicated by the hover slide, the display displays the contents by performing an operation assigned to the hover slide, and
when the return manipulation is judged to be indicated by the hover slide, the display displays the contents without performing the operation assigned to the hover slide,
wherein the judging processor discriminates between the hover slide indicating the valid manipulation and the hover slide indicating the return manipulation, based on a speed of the movement of the indicator.

2. The input device according to claim 1,
wherein the judging processor discriminates between the hover slide indicating the valid manipulation and the hover slide indicating the return manipulation, also based on a distance between the indicator and the screen.

3. The input device according to claim 2,
wherein the judging processor judges the hover slide indicates the return manipulation when the distance is larger than a predetermined threshold.

4. The input device according to claim 1,
wherein the judging processor judges the hover slide indicates the return manipulation when the speed is faster than a predetermined threshold.

5. An input device, comprising:
a display that displays contents on a screen;
a detector that detects an indicator and, at least one of a hover slide performed by the detected indicator and a contact to the screen performed by the detected indicator, the hover slide being a movement of the indicator substantially parallel to the screen without contacting the screen;
a judging processor that judges to ignore contact to the screen detected between a first contactless hover slide and a second contactless hover slide, when the contact meets a predetermined ignoring condition; and,
a controller that controls the display so that,
when the contact is judged to not be ignored, the display displays the content by performing an operation assigned to the first hover slide, an operation assigned to the contact and an operation assigned to the second hover slide, and
when the contact is judged to be ignored, the display displays the contents by performing an operation assigned to a successive hover slide without performing the operation assigned to the contact, the successive hover slide including the first hover slide and the second hover slide.

6. The input device according to claim 5, the ignoring condition is at least one of:

a condition that a position of the contact is substantially on a locus on the screen corresponding to the second hover slide; and a condition that a direction of the first hover slide and a direction of the second hover slide are opposite from each other and the position of the contact is substantially on a point on the screen corresponding to where the first hover slide ends and the second hover slide starts.

7. A method of controlling a display using an input device, comprising:

displaying contents on a screen of a display;

detecting, via the input device, an indicator and a hover slide performed by the detected indicator, the hover slide being a movement of the indicator substantially parallel to the screen without contacting the screen;

judging whether the detected hover slide indicates a valid contactless manipulation from a starting position or a contactless return manipulation which is performed after the valid contactless manipulation to return the indicator to a substantially same position as the starting position, and controlling the display so that, when the valid manipulation is judged to be indicated by the hover slide, the display displays the contents by performing an operation assigned to the hover slide, and when the return manipulation is judged to be indicated by the hover slide, the display displays the contents without performing the operation assigned to the hover slide, wherein the judging discriminates between the hover slide indicating the valid manipulation and the hover slide indicating the return manipulation, based on a speed of the movement of the indicator.

8. A tangible non-transitory computer readable storage medium that stores a computer program, the computer program, when executed by a processor of an input device, causing the input device to perform a process comprising:

displaying contents on a screen of a display;

detecting an indicator and a hover slide performed by the detected indicator, the hover slide being a movement of the indicator substantially parallel to the screen without contacting the screen;

judging whether the detected hover slide indicates a valid contactless manipulation from a starting position or a contactless return manipulation which is performed after the valid contactless manipulation to return the indicator to a substantially same position as the starting position, and controlling the display so that, when the valid manipulation is judged to be indicated by the hover slide, the display displays the contents by performing an operation assigned to the hover slide, and when the return manipulation is judged to be indicated by the hover slide, the display displays the contents without performing the operation assigned to the hover slide, wherein the judging discriminates between the hover slide indicating the valid manipulation and the hover slide indicating the return manipulation, based on a speed of the movement of the indicator.

9. A method of controlling a display using an input device, comprising:

displaying contents on a screen of a display;

detecting an indicator and at least one of a hover slide performed by the detected indicator and a contact to the screen performed by the detected indicator, the hover slide being a movement of the indicator substantially parallel to the screen without contacting the screen;

judging to ignore a contact detected between a first contactless hover slide and a second contactless hover slide, when the contact meets a predetermined ignoring condition; and, controlling the display so that, when the contact is judged to not be ignored, the display displays the content by performing an operation assigned to the first hover slide, an operation assigned to the contact and an operation assigned to the second hover slide, and when the contact is judged to be ignored, the display displays the contents by performing an operation assigned to a successive hover slide without performing the operation assigned to the contact, the successive hover slide including the first hover slide and the second hover slide.

* * * * *